US008566714B1

(12) United States Patent
Stringer et al.

(10) Patent No.: US 8,566,714 B1
(45) Date of Patent: Oct. 22, 2013

(54) CATALOG ACCESSORIES META-CONFIGURATOR, AND ITS USE THEREOF

(75) Inventors: David Stringer, Rock Hill, SC (US); James Brooks, York, SC (US); Stephen Miller, Charlotte, NC (US); Brian Smithson, Clover, SC (US)

(73) Assignee: Insignia Group, L.C., Rock Hill, SC (US)

( * ) Notice: Subject to any disclaimer, the term of this patent is extended or adjusted under 35 U.S.C. 154(b) by 64 days.

(21) Appl. No.: 13/237,446

(22) Filed: Sep. 20, 2011

Related U.S. Application Data

(60) Provisional application No. 61/384,372, filed on Sep. 20, 2010.

(51) Int. Cl.
*G06T 19/20* (2011.01)
*G06F 17/50* (2006.01)
*G06T 17/00* (2006.01)

(52) U.S. Cl.
USPC ........... 715/273; 715/201; 715/202; 715/204; 715/234; 715/239; 715/243; 715/249; 715/277; 715/964; 345/419; 345/427; 345/619; 345/630; 345/643; 345/645

(58) Field of Classification Search
USPC ......... 715/201, 202, 204, 234, 239, 243, 249, 715/273, 277, 714, 964; 345/419, 427, 619, 345/630, 643, 644, 645
See application file for complete search history.

(56) References Cited

U.S. PATENT DOCUMENTS

| | | | |
|---|---|---|---|
| 6,611,843 B1 * | 8/2003 | Jacobs | 1/1 |
| 7,106,343 B1 * | 9/2006 | Hickman | 345/589 |
| 7,124,289 B1 * | 10/2006 | Suorsa | 713/1 |
| 7,188,333 B1 * | 3/2007 | LaMotta et al. | 717/106 |
| 7,277,572 B2 * | 10/2007 | MacInnes et al. | 382/154 |
| 7,353,192 B1 | 4/2008 | Ellis et al. | |
| 2002/0165701 A1 * | 11/2002 | Lichtenberg et al. | 703/7 |
| 2003/0046179 A1 * | 3/2003 | Anabtawi et al. | 705/26 |
| 2005/0108215 A1 * | 5/2005 | Thomas et al. | 707/3 |
| 2007/0188488 A1 * | 8/2007 | Choi | 345/419 |
| 2012/0151408 A1 * | 6/2012 | Groth et al. | 715/799 |

* cited by examiner

*Primary Examiner* — Stephen Hong
*Assistant Examiner* — Wilson Tsui
(74) *Attorney, Agent, or Firm* — Nilay Choksi; Anton J. Hopen; Smith & Hopen, P.A.

(57) ABSTRACT

A computer program product for standardizing the appearance of related accessories installed on a base product. The base product and related accessories can be visualized from a plurality of view-angles on a configurator application. An accessory is loaded onto the base product by an image transformation tool that manipulates the accessory to fit onto the base product. The transformed accessory is saved as a t-matrix profile for each view-angle of the base product, and the t-matrix profiles are associated with an accessory classification, which includes additional accessories that similarly fit the base product. The visualization data associated with the base product can then be updated with the t-matrix profiles. A customer GUI is provided for viewing the accessories fitted onto the base product where the transformations can automatically transform other accessories in the same accessory classification on the base product. In an embodiment, the base product is a vehicle.

20 Claims, 23 Drawing Sheets

FIG. 2 – PRIOR ART

```xml
<?xml version="1.0" encoding="UTF-8" standalone="true"?>
<model submodel="Crew Cab / 5' 8" Short Box / Fleetside" model="Silverado 1500" make="Chevrolet" year="2007" name="2007 Chevrolet Silverado 1500 Crew Cab / 5' 8" Short Box / Fleetside" brand="GM" id="2301">
  <viewSet>
    <view angle="000">
      <hotspots>
        <hotspot type="Model">
          <shape z="0"/>
            <media id="33179" type="mask" anchor="122" src="/images/configs/GM/09-Chevrolet-Silverado1500-CrewCab58ShortBoxFleetside/09Silverado1500CrewCab58ShoBoxFle_000_M.png"/>
            <media id="33178" type="image" src="/images/configs/GM/09-Chevrolet-Silverado1500-CrewCab58ShortBoxFleetside/09Silverado1500CrewCab58ShoBoxFle_000_I.png"/>
            <media id="33177" type="decal" src="/images/configs/GM/09-Chevrolet-Silverado1500-CrewCab58ShortBoxFleetside/09Silverado1500CrewCab58ShoBoxFle_000_D.png"/>
        </hotspot>
        <hotspot id="55" type="AssistSteps">
          <shape type="Driver" z="2" tMatrix="0.53596526384355364,0,0,0.52730220556259516,256.25,251.75"/>
        </hotspot>
        <hotspot id="53" type="Background">
          <shape z="-4"/>
        </hotspot>
        <hotspot id="31" type="BedExtender">
          <shape z="1" tMatrix="0.6304931640625,0,0,0.6304931640625,794.7,195.05"/>
        </hotspot>
        <hotspot id="58" type="BedRack">
          <shape z="-1" tMatrix="0.47463861107826233,-0.0042257946915924555,0,0.5149546265660212,525.25,75.25"/>
```

CATALOG ACCESSORIES META-CONFIGURATOR, AND ITS USE THEREOF

CROSS REFERENCE TO RELATED APPLICATIONS

This application claims priority to U.S. Provisional Application No. 61/384,372, entitled "CATALOG ACCESSORIES META-CONFIGURATOR," filed Sep. 20, 2010, the contents of which are hereby incorporated by reference into this disclosure.

FIELD OF THE INVENTION

This invention relates to online selection, visualization, and sale of vehicle accessories. More specifically, it relates to the development and management of visual assets within a relational database to create an experiential online buying experience.

BACKGROUND OF THE INVENTION

1. Visualizing Vehicles on the Internet

Visualizing products online, particularly vehicles and accessories on vehicles, is not new. A challenge is keeping up with the number and variety of possible vehicles and accessories, or parts or products, in the marketplace. For example, in 2008, General Motors alone offered 128 distinct vehicle models. Each one came in several colors. A configurator may show each of those vehicles from as many as eight (8) angles. That's well over 2300 unique views of a vehicle, and each one probably offers 15-20 configurable OE (Original Equipment, e.g., Ford) accessories. Managing the visualization of tens of thousands of parts on thousands of vehicle make, model, color, and view-angle combinations is a monumental task.

Accordingly, what is needed is a method for the rapid and organized production and deployment of vehicle configurators.

2. Conventional Techniques

Configurators can be found in the prior art. Generally, the functionality of the original configurators was relegated to self-contained run-time executables. Then the final published configurator file became an interactive ADOBE FLASH .swf file.

Lines of action script were hard-coded in the FLASH source file, and they essentially instructed that when a particular button is clicked, the file is to look for a movie clip named "X" and place it at these coordinates. There was vehicle-to-accessory logic beyond the simple action script of clicking one accessory to see it on the vehicle. All verification of specific fitment of an accessory to a vehicle was done as part of the hard-coding process and not based on any code-based logic. Conflict logic was based entirely on FLASH's inability to place two movie clips sharing the same instance name on the stage at the same time. This method of development and delivery was not scalable to the volume of vehicle-to-accessory information contained in the accessories catalog database.

In the prior art, development iterations began by attempting to bind configurator interaction to the actual accessories catalog database. To accomplish this and in addition to all accessories information already in the database, such as product name, application fitment, color, brand, pricing, description, product image, etc., additional data criteria were added: vehicle asset type (image, mask, or decal) and view.

The labels given to the three image types/assets in the vehicle asset type were Image, mask, and decal. Unpainted portions of the vehicle retained their color, while painted areas were set to a desaturated gray. Combining an Image and a mask resulted in a desaturated .png file with a fully transparent background. Combining a decal with an Image and a mask still retained an entirely desaturated .png file with a fully transparent background, as depicted by FIG. 4.

When the assets were layered on top of one another, a hexadecimal RGB value was fed into the desaturated mask layer and changed the color of the vehicle. Highlights and shadows remained sharp due to the decal layer, and the other elements of the vehicle (tires, glass, headlights, chrome, etc.) were unaffected as they were viewed through holes in both the mask layer and the decal layer.

Once a designer had a set of accessory image assets created and a portfolio of part images to place, the designer could build a source file in ADOBE PHOTOSHOP. Here, the designer could scale, rotate, skew, and place the part image so it would look realistic on the vehicle image, as depicted in FIG. 6. Once the designer placed the part image onto the vehicle, the designer could record the data points for the exact x/y positioning, scale, and/or angle of rotation, among other measurements, for that part on this view angle on this vehicle from the layered source file.

Next, via tedious hand-coded structured query language (SQL), a configurator could be built and deployed using t-matrices to place and position accessories on vehicles. This process was profoundly time-intensive driven by the database of available accessories. Consequently, if a part was discontinued and disappeared from the database, it also disappeared from the configurator.

Although the process had evolved to a point where the database communicated with the configurator, the labor-intensive production process (duplicating part assets, translating placement work to t-matrices, hand-coding SQL based on those translations) made rapid and organized deployments unfeasible. Thus, the solution to alleviate this labor-intensive production process was to develop "META," a tool for the rapid development of vehicle-to-accessory visual configurators.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF INVENTION

Certain embodiments of the current invention describe a computer program product including software executable instructions stored in a computer readable medium for performing a method by running a software program on a computer and including issuing instructions from the computer software program. In one embodiment, this method comprises providing a configurator that accesses an extensible structured document, wherein the extensible structured document contains language for a default product, whereby a designer can alter language for a class of accessories, and language for a punt product, whereby a designer can create a punt for a base object; creating at least one hotspot for the base object, corresponding to at least one accessory on the base object, wherein the at least one accessory may have a default t-matrix within the at least one hotspot; stacking the at least one hotspot on the base object with its x, y and z values, wherein the at least one hotspot may have multiple layers on the base object; coding the at least one hotspot to contain a vMask or default image used to display factory-installed accessories, and an instance used to hold at least one symbol, whereby the designer can alter the at least one accessory, in turn transforming all accessories within the at least one hotspot without further modification; applying applicable exclusion rules; sending language for the at least one accessory to the configurator, such that images associated with the at least one accessory can be retrieved and loaded into its corresponding at least one hotspot; and altering the at least one hotspot on the base object, wherein the alteration can apply to the corresponding at least one accessory.

In a further embodiment, the base product is a vehicle. In another embodiment, the instructions for the extensible structured document contain language for allProducts.

In another embodiment, the instructions further comprise generating an SQL database and executing the SQL database, including mounting a shared image asset library and a staging server; collecting the layer, image, and t-matrix information from the shared image asset library; converting the layer, image, and t-matrix information into stored procedure calls; and uploading the stored procedure calls onto the staging server. In a further embodiment, the information populating the SQL database comprises the view type and layer type of the accessories.

In another embodiment, the computer program product includes instructions for updating the instance affected by a symbol when a symbol class is altered in the extensible structured document. In another embodiment, the computer program product includes instructions for graphically adjusting a t-matrix of the instance. In another embodiment, the computer program product includes instructions for adding images to the configurator through use of a specific naming standard. In another embodiment, the computer program product includes instructions for adding images to the configurator through selection of an associated accessory and applying the associate accessory to a space on the base object.

In one embodiment, the computer program product may be written in ADOBE ACTIONSCRIPT. The configurator may be created by ADOBE FLASH. The computer program product may be executed through ADOBE AIR. The computer program product may be executed through local network file-servers. In an embodiment, XML may be used as a communication medium between the configurator and the computer program product.

In a separate embodiment, a computer program product is disclosed including software executable instructions stored in a computer readable medium for performing a method by running a software program on a computer, using the results of providing a configurator that accesses an extensible structured document, wherein the extensible structured document contains language for a default product, whereby a designer can alter language for a class of accessories, and language for a punt product, whereby a designer can create a punt for a base object; creating at least one hotspot for the base object, corresponding to at least one accessory on the base object, wherein the at least one accessory may have a default t-matrix within the at least one hotspot; stacking the at least one hotspot on the base object with its x, y and z values, wherein the at least one hotspot may have multiple layers on the base object; coding the at least one hotspot to contain a vMask or default image used to display factory-installed accessories, and an instance used to hold at least one symbol, whereby the designer can alter the at least one accessory, in turn transforming all accessories within the at least one hotspot without further modification; applying applicable exclusion rules; sending language for the at least one accessory to the configurator, such that images associated with the at least one accessory can be retrieved and loaded into its corresponding at least one hotspot; and altering the at least one hotspot on the base object, wherein the alteration can apply to the corresponding at least one accessory.

In a separate embodiment, the invention discloses a method for the production and operation of configurators, comprising the steps of providing a configurator on a computer medium; opening a base object; importing images of the base object and at least one hotspot with at least one corresponding accessory associated with the base object; placing the at least one hotspot on the base object; altering the at least one hotspot, whereby an alteration to the at least one hotspot corresponds to an alteration to the at least one corresponding accessory; saving the configurator, wherein images of the base object and the at least one hotspot are copied to a virtual private network; and sending information regarding the images of the base object and the at least one hotspot to the database via stored procedure calls.

These and other features of the invention will be more readily understood upon consideration of the attached drawings and the presently-preferred and other embodiments of the invention.

BRIEF DESCRIPTION OF THE DRAWINGS

For a fuller understanding of the invention, reference should be made to the following detailed description, taken in connection with the accompanying drawings, in which:

FIG. 9 is an XML of an embodiment of the configurator page;

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used herein, the terms "accessory", "part" and "product" may be used interchangeably to refer to any supplementary component or object that may be utilized within a vehicle. An accessory may have a variety of characteristics, any of which may affect its placement and look, for example angle and color.

Figure 3:
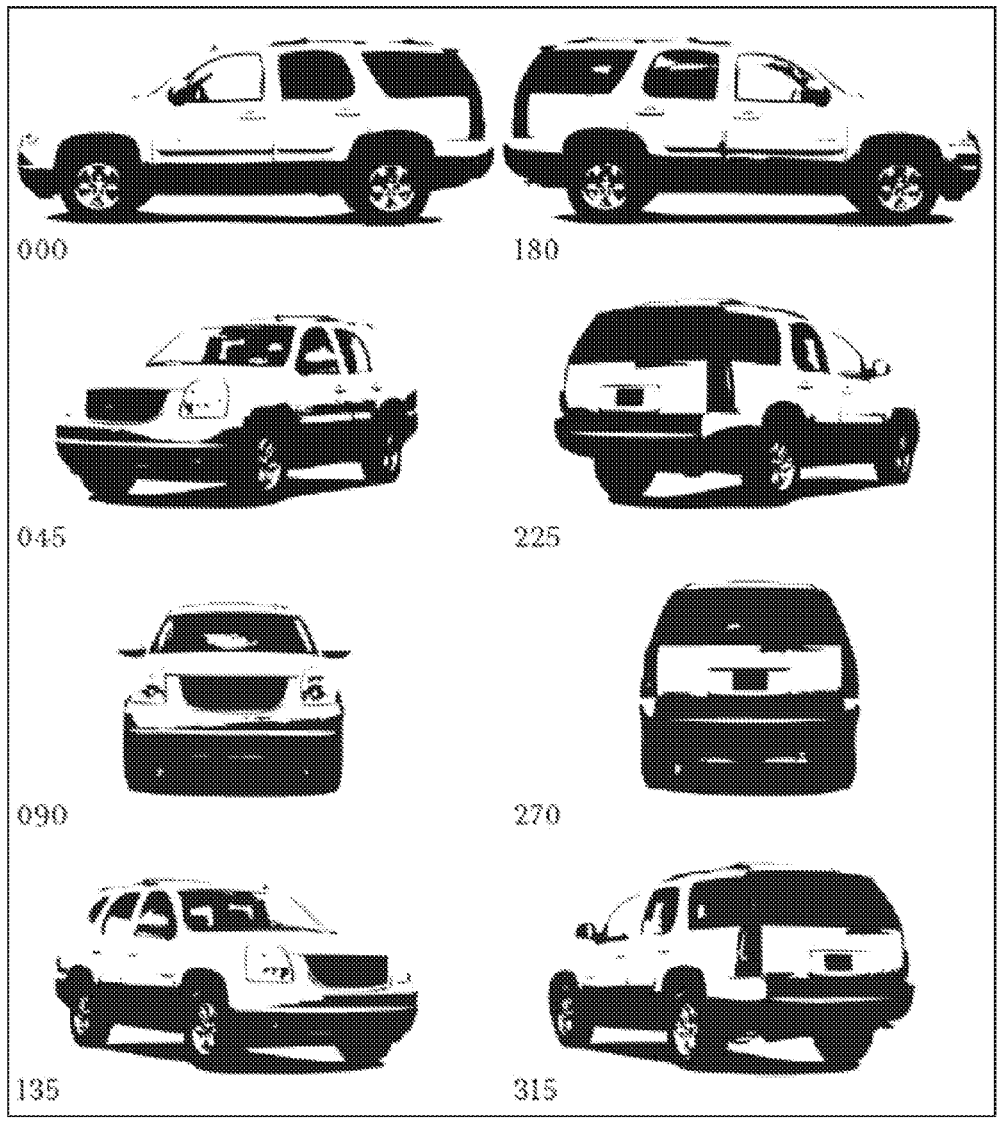
FIG. 3 is a snapshot of multiple viewing angles used to support rotation.
Figure 4:
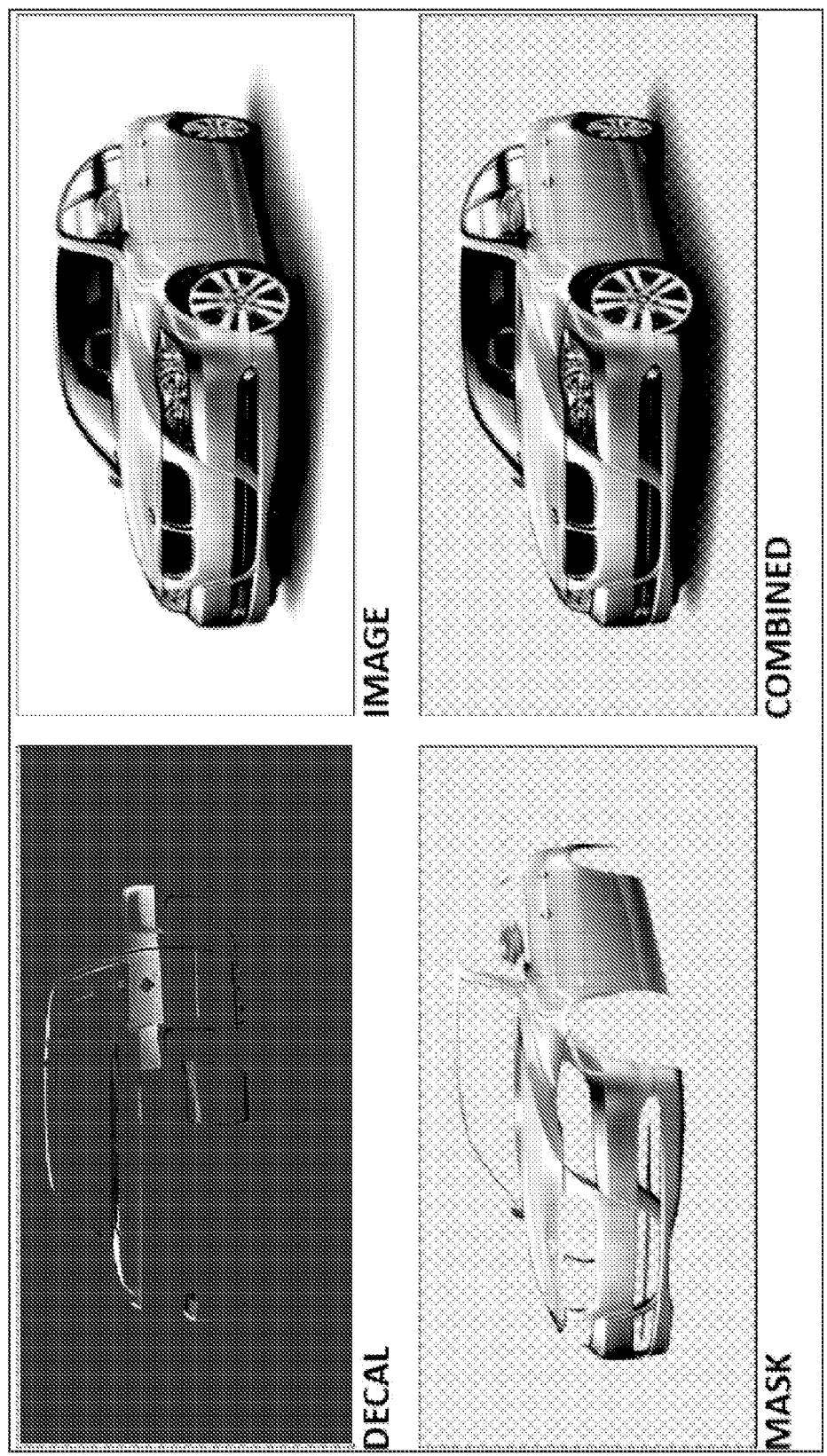
FIG. 4 depicts the different layers used to support color changes.
Figure 5:
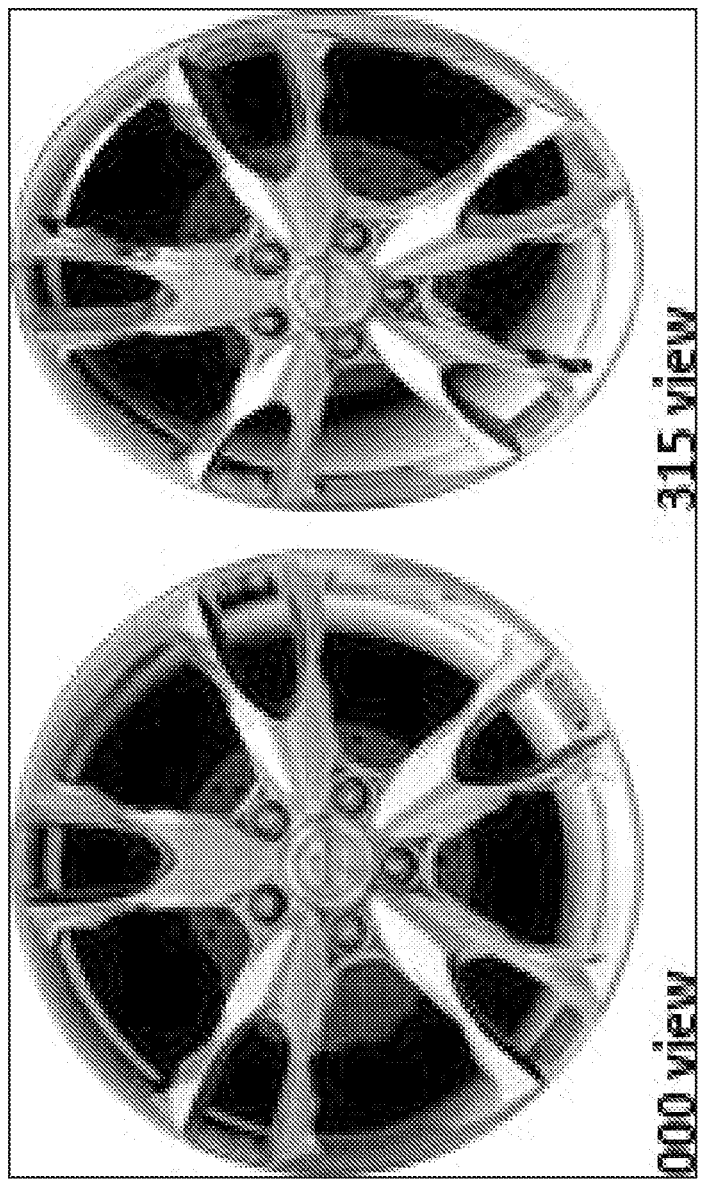
FIG. 5 depicts multiple viewing angles of an accessory to be placed.
Figure 6:
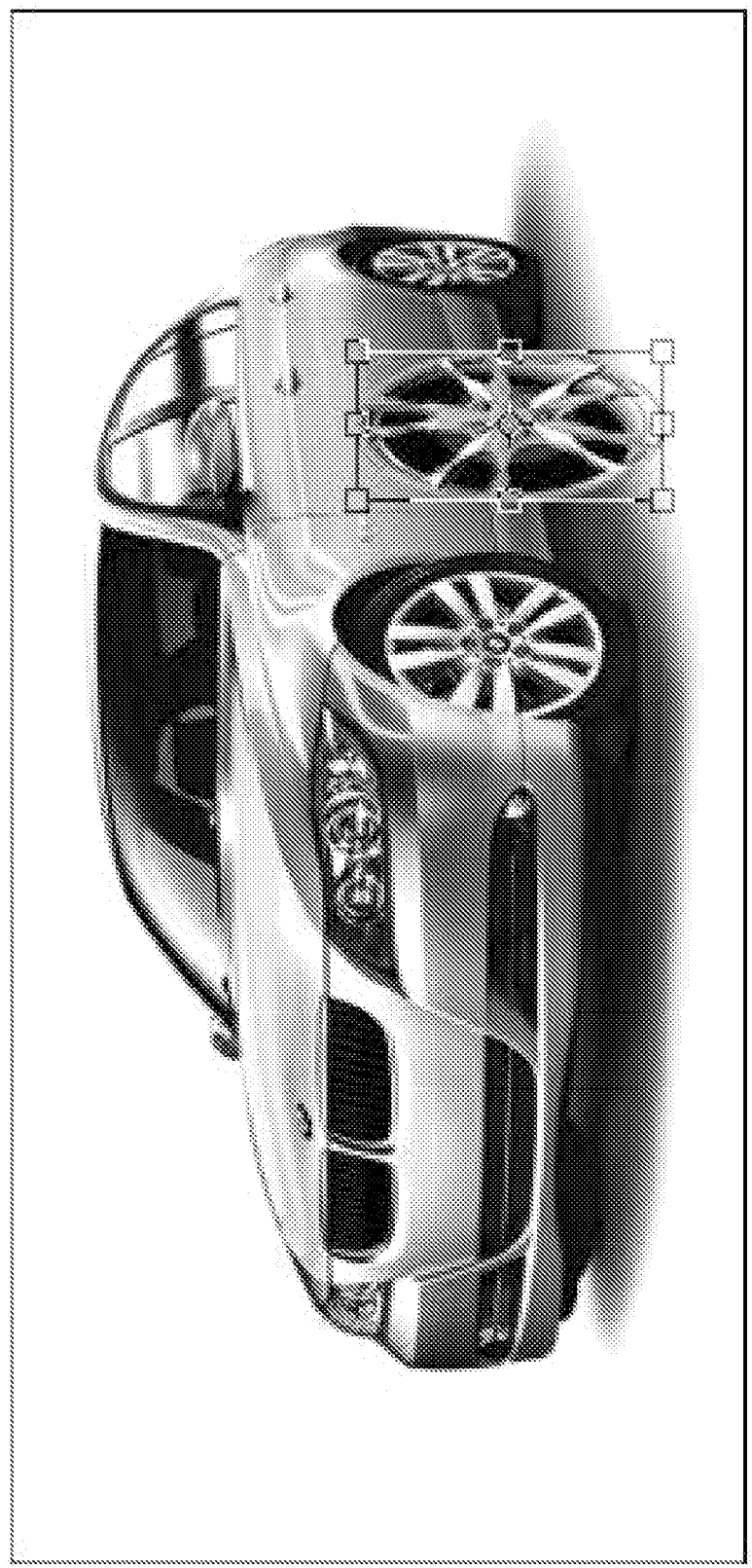
FIG. 6 depicts accessory placement on a vehicle.

The term "accessory image assets" as used herein refers to a range of visualizations of a selected accessory. Examples are depicted in FIG. 3, but may include 000, 045, 090, 135, 180, 225, 270 and 315 with corresponding angles of the accessories shown. The range gives taxonomy for accessory assets as seen from at least eight different points of view.

The term "allProducts" is used herein to refer to a product XML containing every possible hotspot, and the parts available in each hotspot on a vehicle.

The term "base object" is used herein to refer to any area or object with hotspots that define properties with images and angles, and its identifying information thereof. For example, a base object can be a vehicle and its identifying information could be its year, make, model, sub-model, etc.

The term "configurator" is used herein to refer to the area of the web application where a user can 'configure' a vehicle, or preview what it might look like with certain accessories installed.

The term "decal" as used herein refers to shadows and highlights of a vehicle.

The term "default product XML" as used herein refers to a product XML containing product information that is held the same across all vehicles.

The term "exclusion rules" as used herein refers to instructions that applying when certain parts are unable to be installed if certain other parts are on the vehicle. A part can be removed from the vehicle by removing from within the configurator, removing from outside the configurator, triggering HTML form post-back, or removing from the shopping cart The term "hotspot" is used herein to refer to a geometrical location on a base object at an angle where an accessory can be applied. Hotspots may utilize the part classification system, such that when an accessory is placed on a base object's hotspot, all accessories—that are in the catalog, that are classified as this particular accessory and that fit this specific vehicle—may appear on the configurator.

The term "Image" as used herein refers to a .png file, or equivalent, displaying the entire vehicle.

The term "instance" is used herein to refer to a visual representation of a symbol.

The term "mask" as used herein is any part of a vehicle that would be painted. This includes the body, hood, mirror caps, bumper, etc. However any plastic, chrome, glass, etc. that does not receive paint may not be considered a mask.

The term "media" as used herein refers to the association with a symbol that can be an image, a mask, or a decal. Media is the data for a single image, The term "part-configurator-view" as used herein refers to the asset for each angle that a part might be visualized on a vehicle.

The term "punt" as used herein refers to drilling down to a single accessory within a class and making edits to that one part.

The term "punt product XML" is used herein to refer to a product XML containing information specific to a vehicle.

The term "shape" as used herein refers to each layer that a hotspot may contain.

The term "staging server" is used herein to refer to a temporary stage to assemble, test or review new or revised base object-accessory combinations and views prior to making them live.

The term "symbol" is used herein to refer to hotspots that are not placed on the vehicle and are stored in the library.

The term "symbol class" as used here in refers to a list of XML nodes containing either references to another symbol or media.

As used herein, the terms "transformation matrix" or "t-matrix" may be used interchangeably to refer to the designer's collected data points, discussed supra, translated into a string of numbers. A default t-matrix refers to the data points common to accessories within a hotspot.

The term "vehicle asset type" as used herein refers to a family of three assets layered on top of one another to allow for color changes. Before the development of a vehicle asset type, changing the color of a vehicle in the system required a separate image to be uploaded for each and every color. For example, if a user changed the 2007 Chevy Tahoe from red to silver, the movie clip containing "2007_Chev_Tahoe_LS_RED.jpg" was removed from the stage and replaced with the movie clip containing 2007_Chev_Tahoe_LS_SILVER.jpg." With a vehicle asset type, the system is able to use three layered images for each view and support an infinite number of colors with less load time.

The term "views" as used herein refers a range of visualizations of a selected vehicle. The range is depicted in FIG. 3, and includes 000, 045, 090, 135, 180, 225, 270 and 315 with corresponding angles of the vehicle shown. The range gives taxonomy for vehicle assets as seen from at least eight different points of view.

The term "vMask" is used herein to refer to a vector image representing 'windows' in barriers, such that products can be viewed through the barriers in order to simulate product occlusion.

1. Problem(S) and Solution(S)

Figure 1:
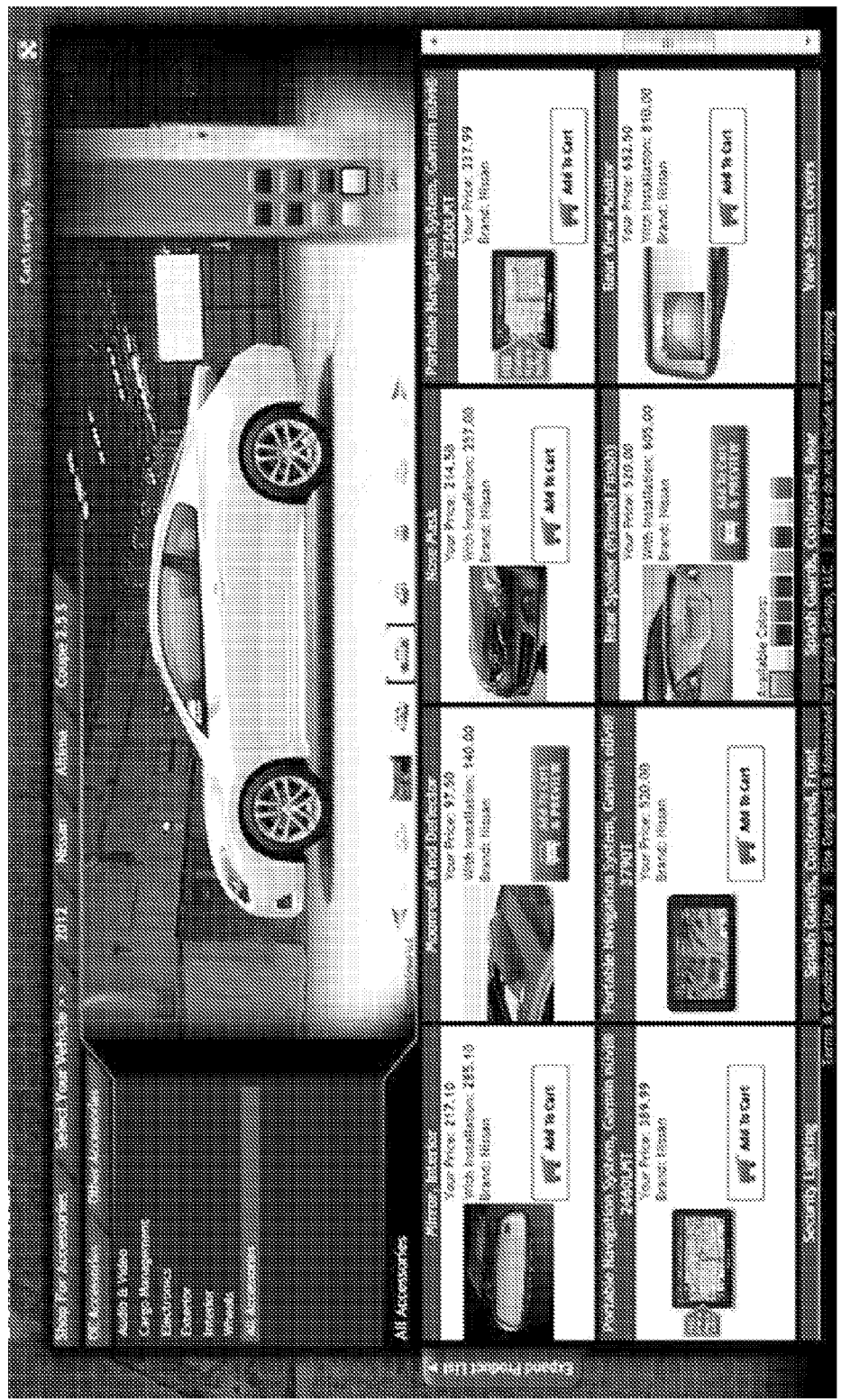
FIG. 1 is a snapshot of an embodiment of META from a user's standpoint.

Certain embodiments of the present invention are capable of building and maintaining automotive accessories catalogs for multiple foreign and domestic vehicle manufacturers. Accessories sales systems are currently in use by nearly one thousand dealerships nation-wide. A significant aspect of the accessories system is the vehicle accessory configurator, depicted in FIG. 1.

Figure 2:
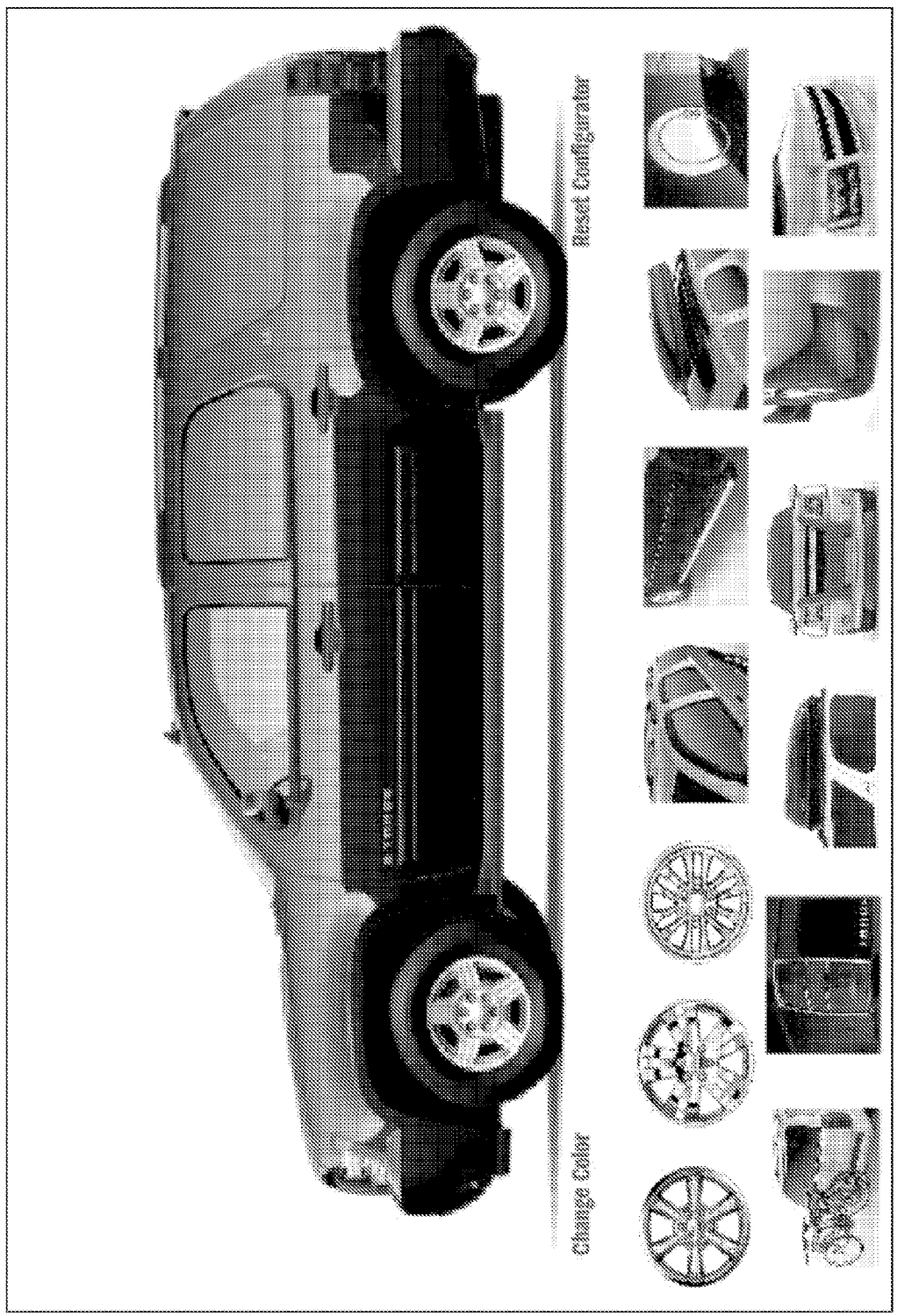
FIG. 2 is a snapshot of an early, non-data-driven, vehicle accessory configurator.

While configurators are found in the prior art, the rapid and accurate production of data-driven automotive configurators has long been a problem. A challenge is keeping up with the number and variety of possible vehicles and accessories, or parts or products, in the marketplace. The challenge faced is not showing customers accessories as they will appear on vehicles, but producing the data-driven assets to show customers thousands of accessories as they will appear on hundreds of vehicles in an organized and timely fashion. Due to these challenges, functionality of the original configurators was relegated to self-contained run-time executables, shown in FIG. 2.

Accordingly, what is needed is a method for the rapid and organized production and deployment of vehicle configurators. To solve this problem, certain embodiments of this invention have been conceived of and diligently reduced to practice and are referred to under the brand METACONFIGURATOR or META.

Certain embodiments of this invention can support a large number of brands efficiently. For each brand, there may be a large number of unique sub-models. For each sub-model, the system may have data covering the past ten (10) years or more. For each of those vehicles, there could be fifteen (15) configurable parts. These are conservative estimates of an ever-changing data set, and yet they represent at least 60,000 possible year-make-model-submodel-accessory combinations. Furthermore, new vehicles may be added or removed and new parts may be added, discontinued, recalled, superseded, or removed at any point. Moreover, part of the value and scalability of META is that certain embodiments allow a designer to transform an entire class of accessories within one hotspot at one time.

2. Overview of META

Figure 7:
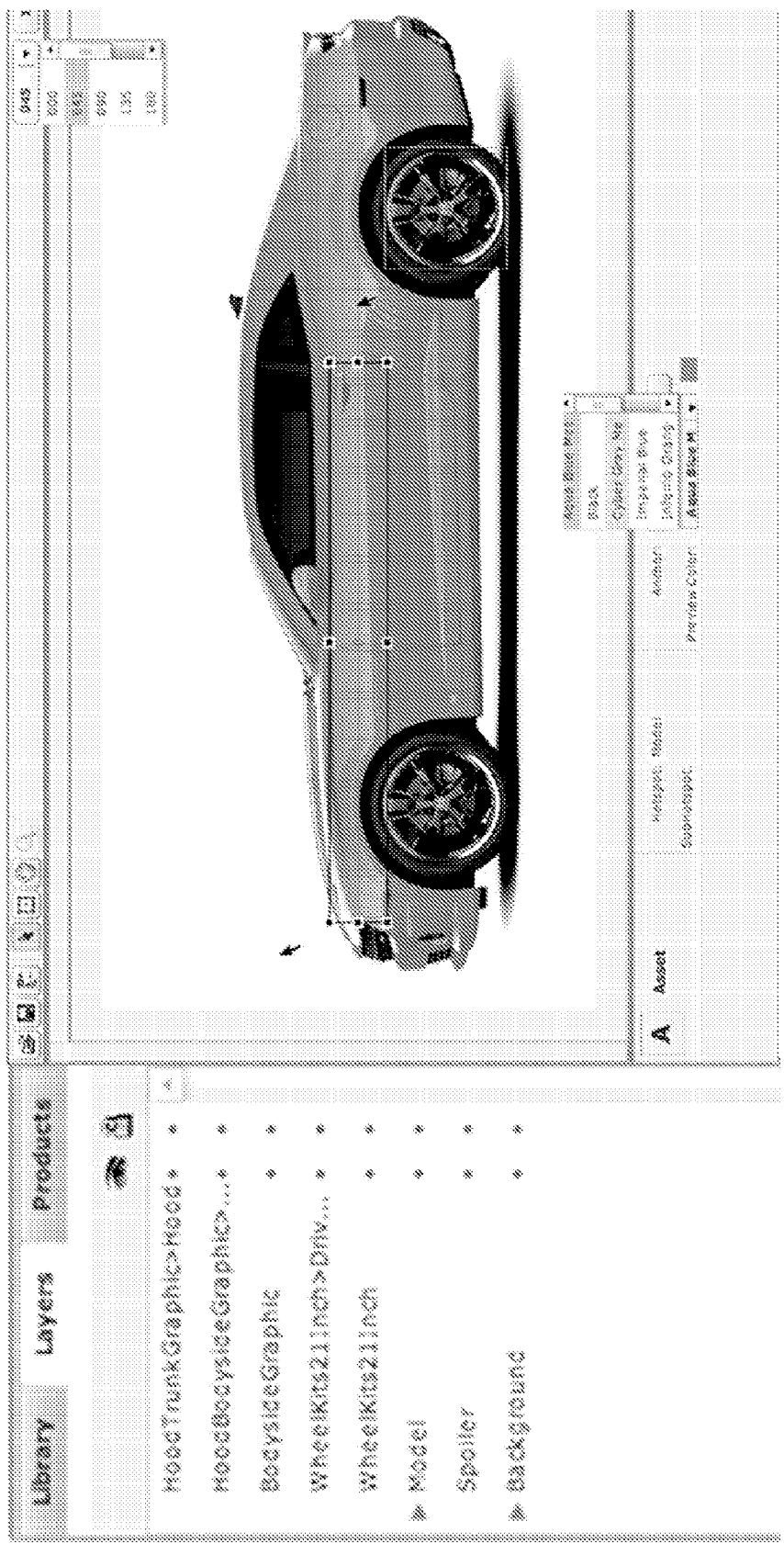
FIG. 7 is a snapshot of an embodiment of META from a designer's standpoint.

In the same way the configurator is a visualization tool for building an accessory shopping cart, one embodiment of META, as depicted by FIG. 7, is a visualization tool for building configurators. In this embodiment, a designer can make needed adjustments to position, rotation, scale, etc. and then simply save it to generate the SQL, build a deployment folder, and post the saved changes to a staging server for review. META can be used in any "like" areas with hotspots that define properties with images and angles. Examples of META applications include, but are not limited to, automobiles, houses, kitchens, and boats. In one embodiment, META is used with the visualization and alteration of vehicles and associated accessories.

Using user interface cues from the platform, META leverages behaviors and functionality already familiar to a designer. Accessory images may be scaled, skewed, and rotated using the same corner schema of the previously-used platform. Items in asset libraries within META use the same layer "stacking" as the designer sees in PHOTOSHOP, FLASH, or AFTER EFFECTS. Accessory categories or parts listed above others appear further forward on the z-axis.

3. Process Flows

A. Configurator Display

Figure 8:
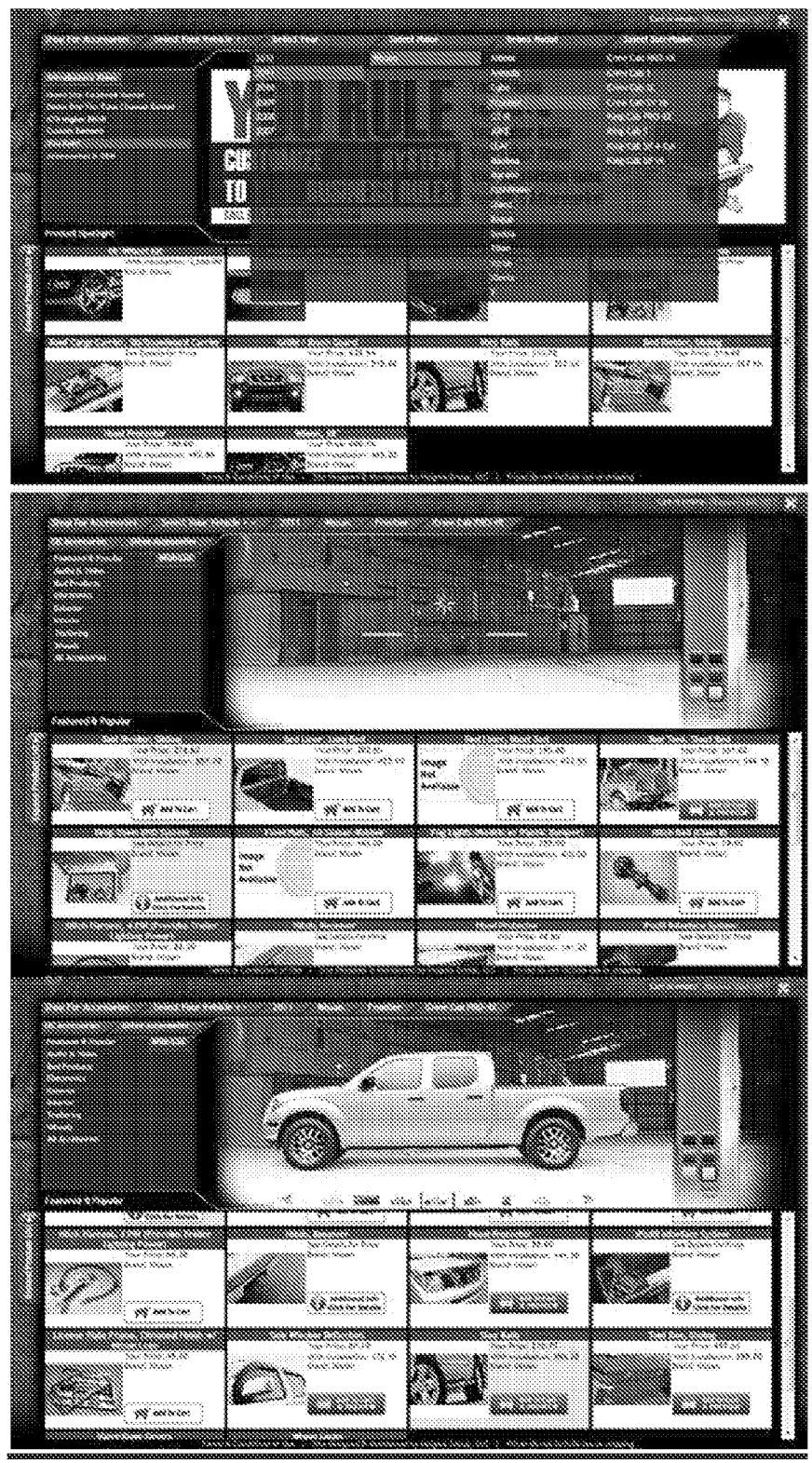
FIG. 8 is a snapshot of vehicle selection within an accessory catalog application of META.

Certain embodiments of the invention may be launched when a user selects a base object in the accessories catalog. There are several paths to the same product list/accessory configurator page in the web application, including, but not limited to, logging into the application with a "favorite vehicle," selecting an accessory that fits a corresponding base object, or selecting a base object from a list, as depicted in FIG. 8. From the web application's landing page, a user may select a vehicle's year, make, model, and sub-model. Once the base object has been selected, the following product list/configurator page(s) is driven by the App ID.

Configurator data about a base object may be organized in the database as a set of the base object's views represented in relational tables. A base object's view is depicted in FIG. 3 and can be further broken down into a number of hotspots.

When a customer selects a base object in the catalog, as depicted in FIG. 8, a query is made to determine if this vehicle has base object views. If it does, the definition of those views and their hotspots is compiled into an extensible structured document, for example Extensible Markup Language (XML) or equivalent set of rules for encoding documents in machine-readable form. The XML may be organized in any way, for example hierarchically by views, hotspots, and geometry, as depicted in FIG. 9. The configurator can accept the XML either as a stream returned by a URL on the catalog servers or as payload in the initial launch of the configurator. Transmitting the XML as payload may reduce the overall launching time of the configurator because the latency of the additional server-query is avoided.

Figure 10:
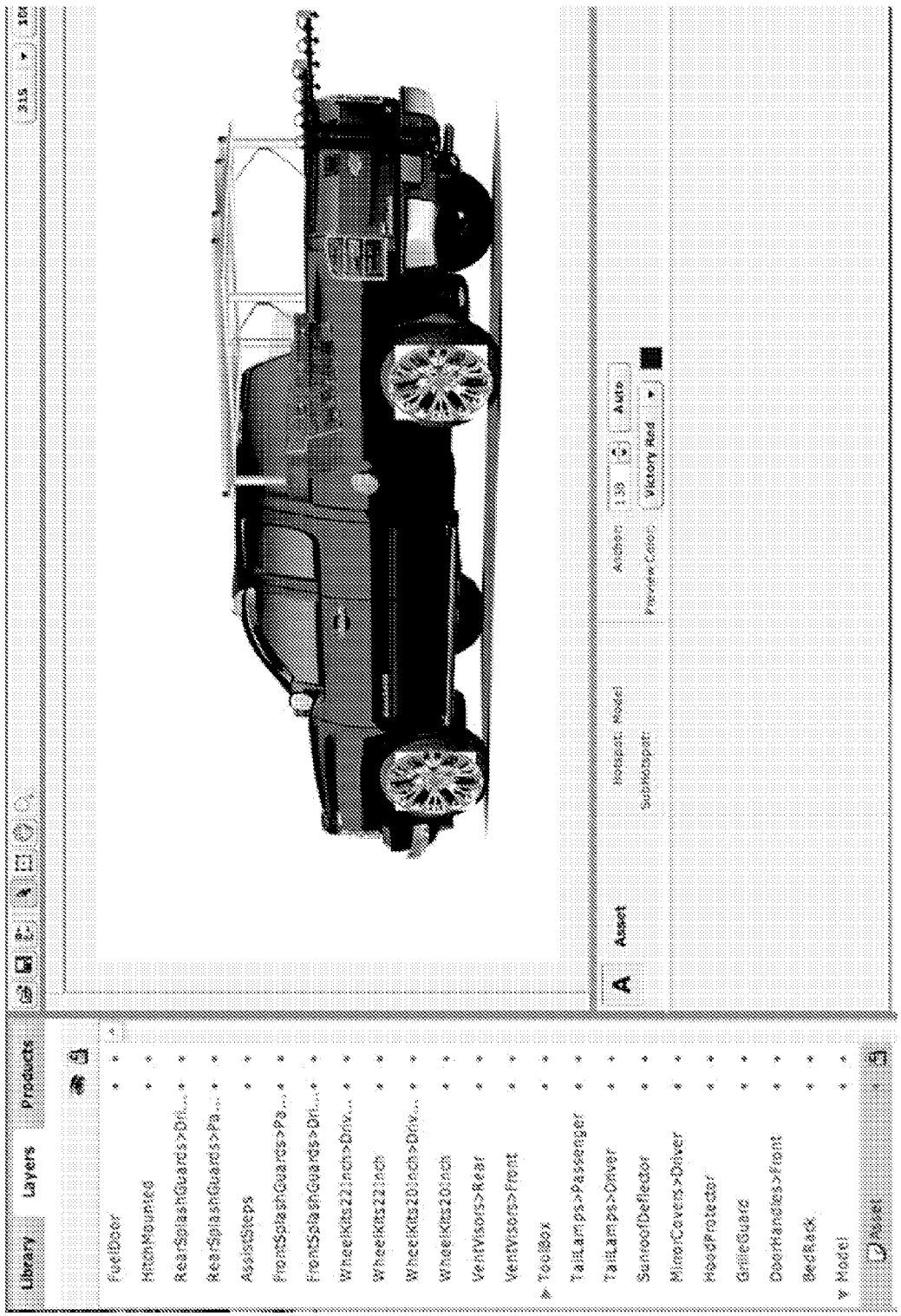
FIG. 10 depicts the vMask; this allows only those sections of the toolbox not occluded by the wall of the truck bed to be visible.

In order to display a vehicle, the configurator may load associated accessory views; transform accessories via scaling, skewing, translation and rotation; manage image depth; and communicate with the server. To load accessory views, actual images of the vehicle may be taken at set angles and split into images, masks, and decals. This may include vMasks, as depicted by FIG. 10. The images may be organized and loaded into the configurator. For example, the organization may comprise a hierarchical structure with locations for the collection of vehicle views, individual views, default products that are loaded on the vehicle, custom products that may be loaded on the vehicle, and vMasks providing occlusion information.

Certain embodiments of the present invention allow use of a single accessory across multiple base objects, while still using the same accessory image. Information of the accessory may be saved in the XML, as depicted by FIG. 9, and may be parsed by the configurator in order to adjust the images accordingly. The information comprising the adjusted imaged may be saved in t-matrix attributes in the XML.

Certain embodiments of the present invention also allow the possibility of changing the color of an image, while avoiding the need to use different images for each color in which a base object or accessory might be offered. The art teaches that colorable images are grayscale and are associated with an integer value from 0-255 that represents its average brightness. A completely black image has a value of 0, while a completely white image has a value of 255. Each desired color is associated with a hex RGB value. In one embodiment, pure white would have a value of #FFFFFF, while pure black would have a value of #000000. The colors of the grayscale image are subsequently shifted according to these two values. If the target color is #FFFFFF (R:255, G:255, B:255), and the average grayscale value for the image is 128, all the pixels in the image can be shifted +127, +127, +127. If the target color is #000000, all the pixels would need to be shifted −128, −128, −128.

In order for images to be occluded correctly, the XML may track how to stack the hotspots correctly. This is recorded by the "z" attribute of the model XML. Hotspots that are above the main vehicle (referred to by the term "model") hotspot have a value above "0" with each successive layer's z attribute increasing by 1. Hotspots below the model hotspot have a value below "0" with each successive layer's z attribute decreasing by −1. The model hotspot itself has a value of "0". Any platform that accomplishes these requirements can be used to render this XML data. In one embodiment, an ADOBE FLASH platform is used.

In one embodiment, the configurator has an interface capable of accepting calls to pass in as an XML string to add a product, remove all products, and remove a single product. The interface may include any suitable prototype-based scripting language, for example JAVASCRIPT, server-side processing, SPROUTCORE, etc. Because the model XML is a product of the HTML page onto which the configurator is rendered, the XML is available to the configurator as soon as it is loaded. The configurator immediately begins iterating through the hierarchy, creating the MOVIECLIP classes associated with each XML node type. For most products there is a 1:1 correspondence between the attributes of each XML node and the properties associated with each subclass. When a t-matrix is achieved, it may be converted into a source file and applied to the platform. This is the default t-matrix that will be applied to any product that is loaded in this hotspot. As images are reached, they are loaded into the pre-loader, which allows the user to visualize the progress of how many of the images have been loaded.

B. Configurator Manipulation

Figure 11:
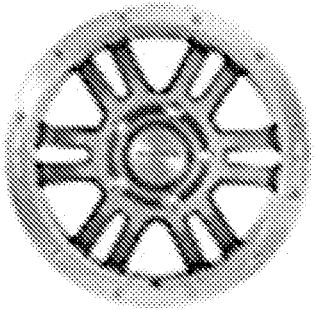
FIG. 11 is an accessory list showing those products that can be added to a given vehicle configurator vs. those which cannot.

From the user's perspective, the experience of shopping for accessories takes place largely in one of three areas: 1) browsing a product list, 2) drilling into product detail screens, and 3) manipulating the configurator as a visualization tool. Manipulating the configurator comprises changing a vehicle's color, rotating the vehicle, and adding or removing select accessories to or from the vehicle. When details about a particular accessory are visible (either in the product list or in the product details views), the user has an option to add that accessory to his/her online cart. For select accessories that have configurable assets, adding that accessory or detail becomes unique. This is particularly useful in the product list view as the configurator may show the user whether an accessory does or does not have configurable assets, as depicted in FIG. 11.

In certain embodiments, gathering data for parts to be displayed in the configurator mirrors the process for vehicles, described supra. Similar to a vehicle, configurator data about an accessory may be organized by view-angle. That is, one or more image assets may be defined for each angle that a part might be visualized on a vehicle. A part that belongs to a part class associated with a hotspot is queried for part-configurator-views. If any are found, they are collected in preparation for transmission to the configurator.

XML may be constructed from the part-configurator-view data of the part in question. This XML can be organized in any functional way, for example hierarchically by view-angle and asset-type. Actual image files are referred to by URL and are resolved by the configurator making web requests of the browser.

Similar to a vehicle, the configurator can accept the XML, containing the part-configurator-view data, either as a stream returned by a URL on the catalog servers or as payload in the initial launch of the configurator. To avoid the latency of the configurator querying the URL to retrieve the XML as a stream, the XML may be packaged into a string and passed to the configurator via a call made by any suitable prototype-based scripting language, such as JAVASCRIPT. By responding to the JAVASCRIPT-initiated function call, the configurator accepts the XML just as if it had come from a URL, thus avoiding delay caused by a configurator querying the URL for the XML.

The product XML used to load part images onto the configurator may be passed into the configurator with the model XML either (1) via a JAVASCRIPT, or equivalent, call or (2) via FLASHVARS, hard coding, or query string. The former may be used when the user selects a part to install on the vehicle, and the latter may be used when the user navigates away from the vehicle and then returns to it, in order to restore the previous state of the vehicle customization.

Once the product data has been sent to the configurator, the associated images may be retrieved and loaded into the appropriate hotspot. Generally, the parts and the hotspot can be linked by a product type attribute. For example, a fuel door hotspot would have a type of "FuelDoor." However, a single part may be associated with more than one hotspot. For example, a "VentVisor" hotspot may have a "Front" hotspot located at one depth and position, and a "Rear" hotspot located at another depth and position. The configurator can assemble large parts that have sections that are partially behind and partially in front of the vehicle. Each part image can also be split into a mask, decal, and image in order to allow coloring. A parameter for a t-matrix is also contemplated to allow for typically small adjustments between products. If the product has a color applied to it, a color property will be associated with it.

A situation may is contemplated where a specific part has a default location in a vehicle, and that part needs to be removed so a new part can be installed. For example, the vehicle may come, by default, with factory wheels, so the factory wheels need to be removed prior to adding another set of wheels. These parts are stored as separate images of only that single part. In one embodiment, no t-matrix is applied to this image, so it is placed on the vehicle by including the appropriate amount of space. As each part image is parsed, the part image is transferred to the pre-loader, which can track and notify the user about the progress of image data loading. In one embodiment, once all of the image data has been loaded, all of the images can appear on the vehicle simultaneously.

Another situation is contemplated where certain parts are unable to be installed if certain other parts are on the vehicle. In one embodiment, each hotspot may include a part but may exclude other parts from being placed in that hotspot or in another hotspot. However, rules for product installation between hotspots also exist. For example, installing a product in a ToolBox hotspot may exclude products from being installed in a BedRack or BedRails hotspot. This relationship may be expressed in the format "<EXC lhHotspot='ToolBox' rhHotspots='BedRack, BedRails'/>". The term "EXC" denotes an exclusion relationship. The term "lhHotspot" denotes the type of hotspot being installed. The term "rhHotspot" denotes the names of the hotspots being excluded. When an exclusion rule is activated, a product removal event is triggered.

Certain embodiments contemplate the removal of a part from the vehicle by removing from within the configurator, removing from outside the configurator, triggering HTML form post-back, or removing from the shopping cart. In one embodiment, a customer may click on a part on the vehicle to be removed. Product removal may be triggered from inside the configurator either when the user clicks on a product to remove it or when mutual exclusion rules apply. Removal of a part from within the configurator involves making a call to a JAVASCRIPT function, triggering the server-side code. In conventional configurators, the user must wait for a call from the server in to remove the part. Certain embodiments of the current invention call for the configurator removing the part immediately, rather than waiting for a call from the server. An advantage of these embodiments is the elimination of undue delays resulting from conventional configurators. Removal of a part generally involves a single part, but a similar method may be used when mutual exclusion rules and multiple parts need to be removed.

In another embodiment, parts may be removed from outside the configurator via a JAVASCRIPT, or equivalent, call. Once a call is received, the removal is handled by a similar function that manages part removal for product removal from within the configurator.

In another embodiment, parts are removed by triggering a form post-back. Each part may be assigned a unique numerical identifier (ID). When the configurator removes a part from the vehicle for any reason, for example through user action or if mutual exclusion rules apply, the ID of the part to be removed may be communicated back to the catalog server. This may be accomplished via JAVASCRIPT and a form post-back. The configurator calls a pre-defined JAVASCRIPT function with a single list or a comma-separated list of the part ID that has been removed from the vehicle. This list may be converted to a string and stored in a hidden form-variable on the page. The page is then posted back to the server for processing. When the form gets posted back to the server, the hidden form-variable is examined for a list of part ID's that have been removed from the configurator. The customer's shopping cart is checked for these parts, and if located, is removed and the cart display updated.

In another embodiment, a user may remove a part directly from his/her shopping cart. In this situation, the removal may be communicated to the configurator rendered on the client. To remove a part from the shopping cart, the part must have been added to the cart for the vehicle displayed in the configurator, the part must have part-configurator-views, meaning the part was placed onto the vehicle prior to removal, and the customer must indicate deletion of the part from the shopping cart, for example by clicking a button.

A JAVASCRIPT call may also be made to remove parts a configurator is displaying. The part ID may be needed, so a JAVASCRIPT call can be written to the form that will call the configurator with the part ID to be removed. More than one part may be removed automatically if the part the customer removed has related parts that must also be removed or if mutual exclusion rules apply. The form may then be sent back to the client for display. As the resulting user interface is rendering (e.g., cart is updating), a JAVASCRIPT call may be made to the configurator with the ID of the part(s) to be removed.

The process for removing all of the images of a product is the reverse of the process for loading the images. The configurator applies any exclusion rules, removing the parts that a particular hotspot excludes. The configurator may then search through each view, looking for that hotspot, and search through the list of shapes (e.g., Front and Rear) for that hotspot, deleting image information and clearing out information, such as color and anchor tag. Finally, if a default image for this hotspot exists, that image may be re-loaded and the color applied.

C. Configurator Production

Figure 16:
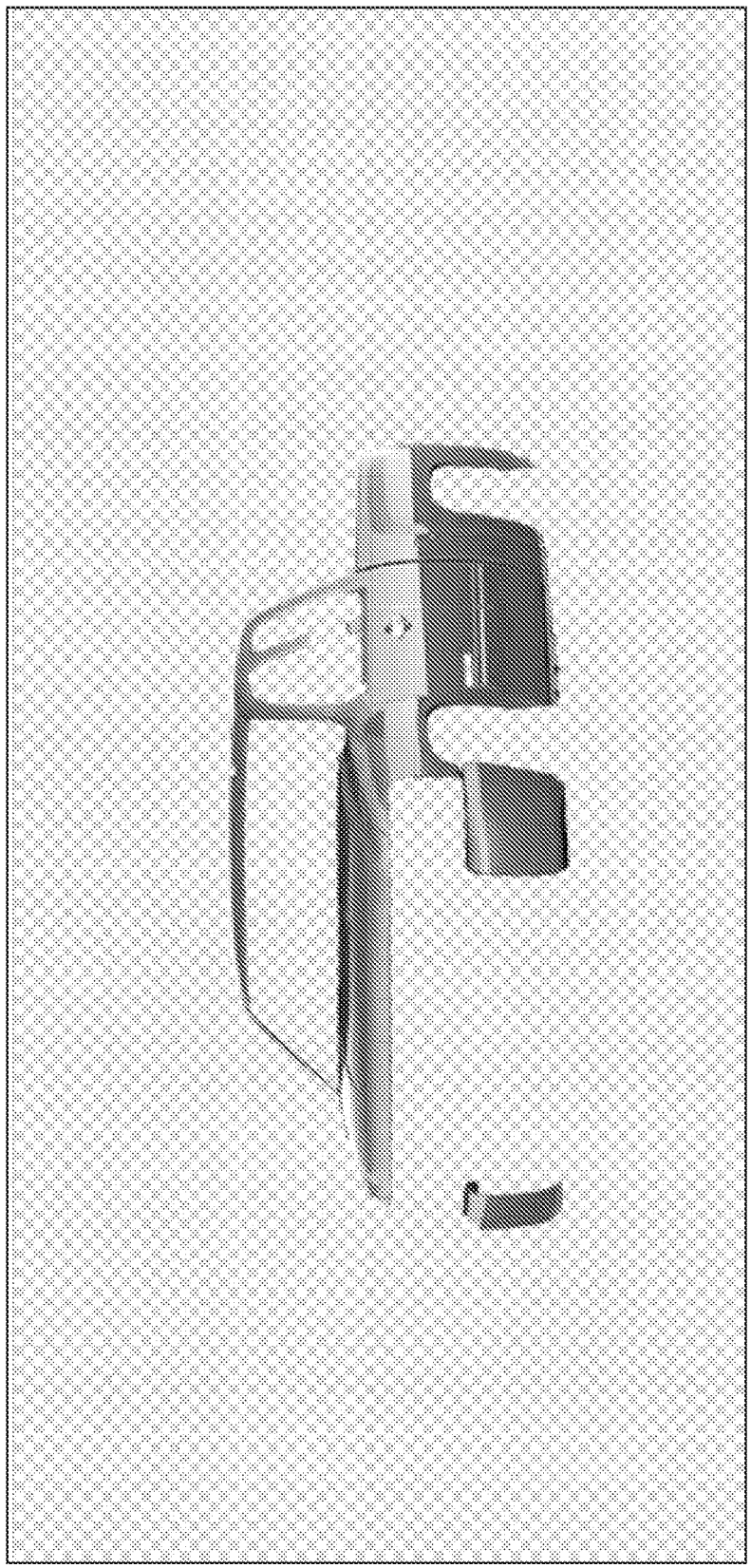
FIG. 16 is an example of a mask of a vehicle.
Figure 17:
FIG. 17 is an example of an image of a vehicle.
Figure 18:
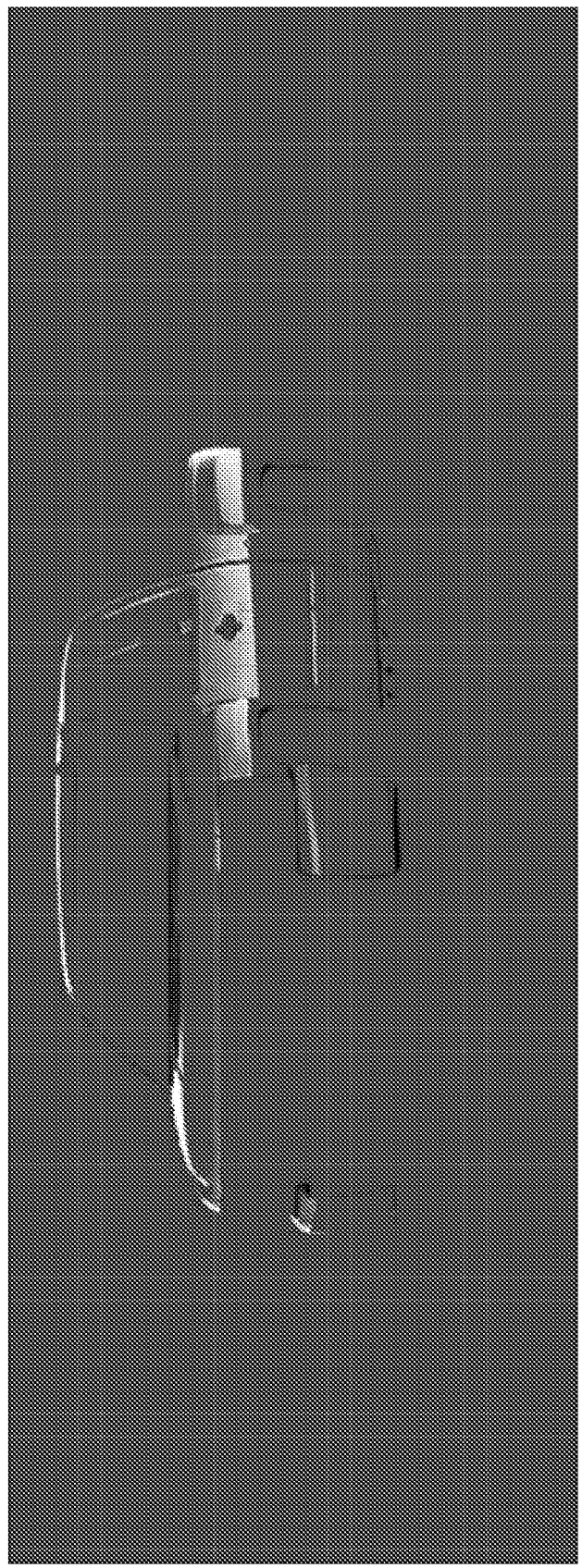
FIG. 18 is an example of a decal of a vehicle.

A configurator asset production may have three assets: mask, image, decal. For example, FIG. 16 depicts a mask that may be coded 10Ram1500CrewCabSLT_000_M.png. FIG. 17 depicts an image that may be coded 10Ram1500CrewCabSLT_000_I.png. FIG. 18 depicts a decal that may be coded 10Ram1500CrewCabSLT_000_D.png. Though an accessory can be shown from any of eight (8) views, only five (5) assets may be needed. Based on the vehicle view diagram depicted in FIG. 3, any accessory image placed on a 000 view can be mirrored to work on a 180 view. The same may be true for the 045 and 135 views, and the 315 and 225 views. Therefore, many configurable accessories may have assets for 000, 045, 090, 270, and 315. The other angles may use mirrored transformations. Some accessories may need even less than five assets, dependent on whether they can be seen in certain views. For example, wheels cannot be seen from either the front (090) or the rear (270) view. Therefore, wheels may only require three (3) image assets (000, 045, and 315).

4. Screenshots/Examples

In one embodiment, prior to launching META, the designer may mount a shared image asset library and a staging server. The shared image asset library contains the configurator source image assets. This library is also where a deployment package generated by META will be saved. The staging server is created when the designer saves work from META. Each time the designer saves work from META, necessary assets are saved to this staging server, and the SQL generated by META can be executed. The designer may place and transform vehicle assets and hotspots within the accessories application. Adjustments can be made in META and a new save can post the adjustments to the staging server, so the SQL generated by META can be executed.

Figure 12:
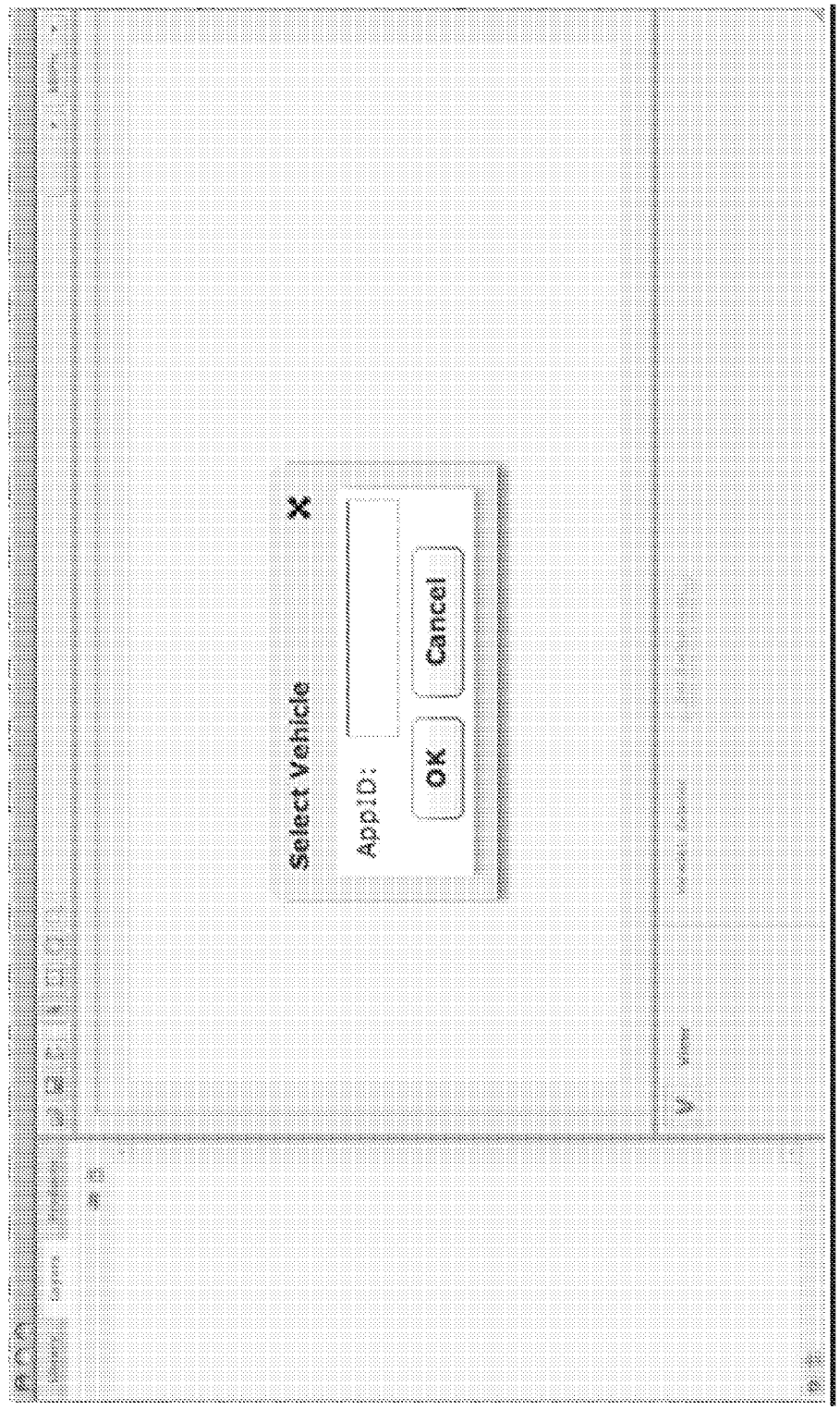
FIG. 12 is an App ID selection screen, or an opening state of the META.

Once the shared image asset library and staging server are mounted and META is launched, META may request an App ID, as depicted by FIG. 12, or any identifier of reaching the base object. Once the identifier is entered, META polls the mounted staging server and displays the configurator for the selected vehicle. However, unlike the conventional configurator .swf, in META all elements of the configurator (assets, hotspots, transformations, etc.) may be edited.

Figure 13:
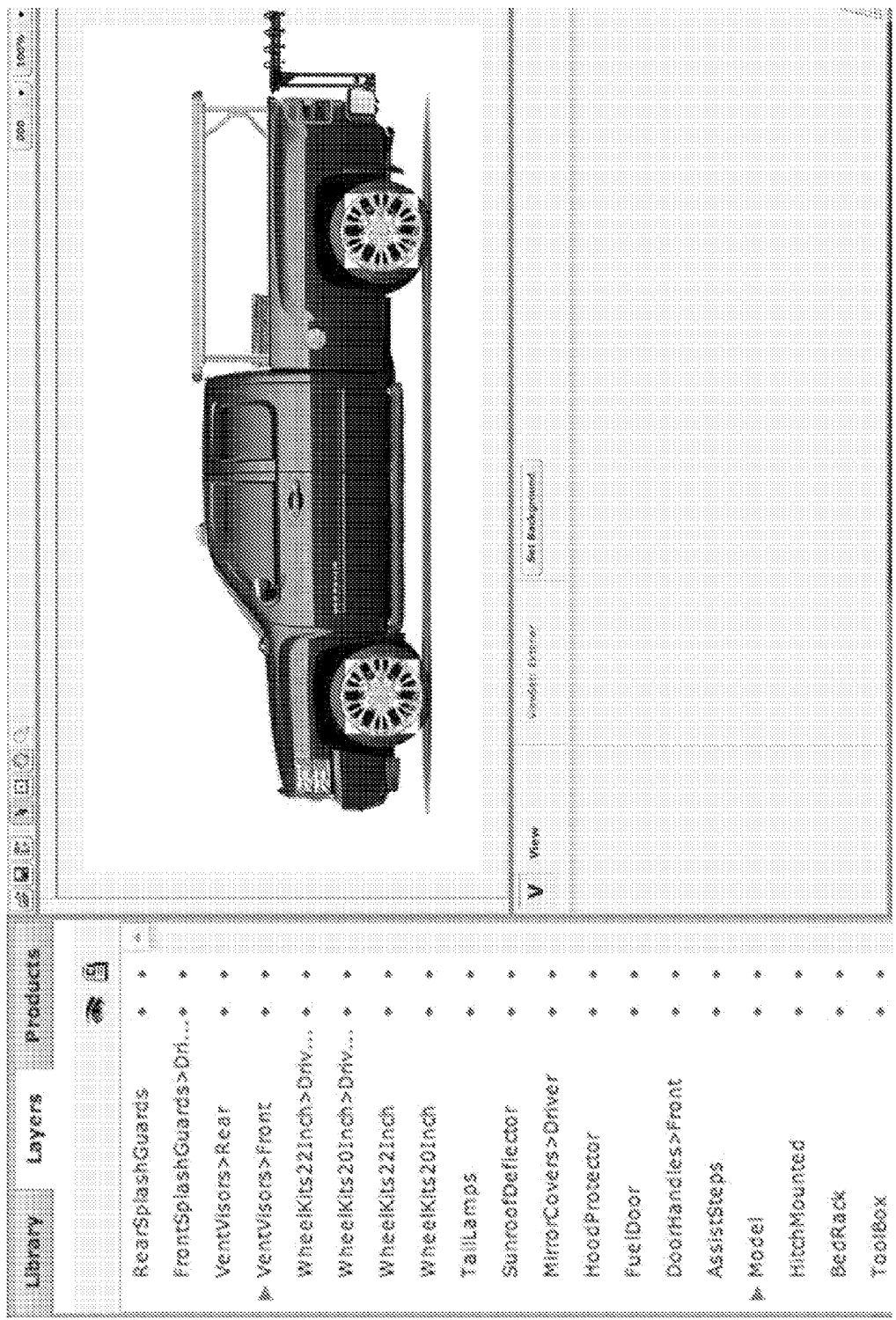
FIG. 13 depicts a snapshot of an embodiment of META, allowing a designer to see all the hot spots currently placed on this vehicle from this angle.
Figure 14:
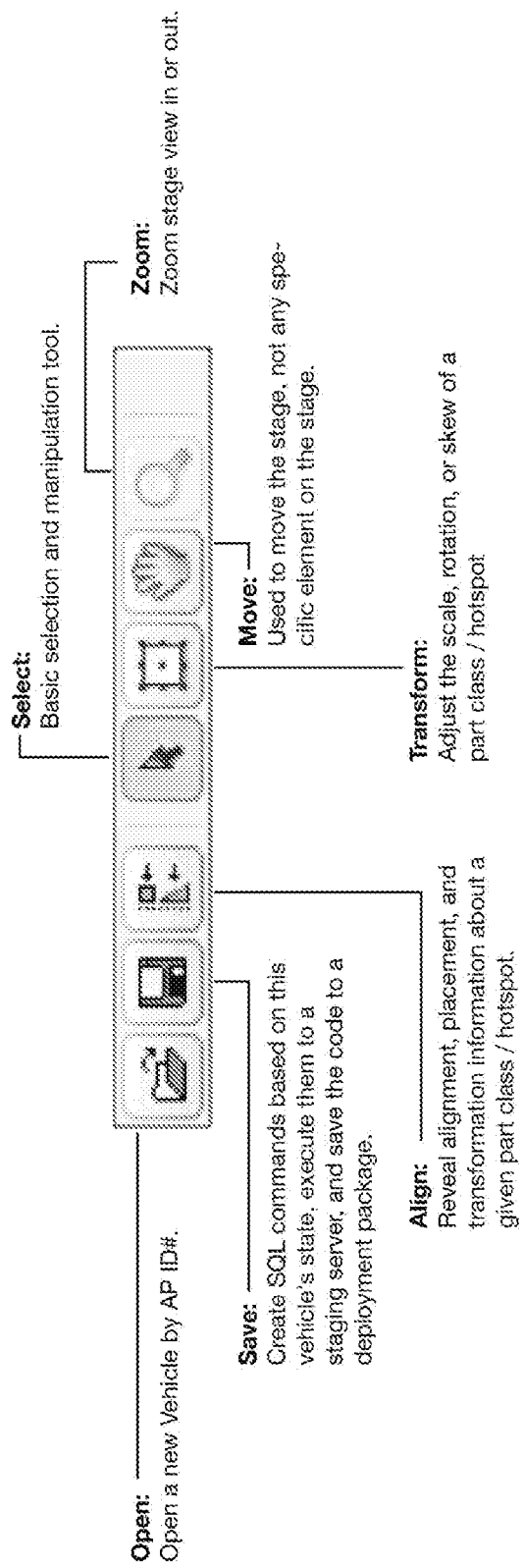
FIG. 14 is a transformation tool bar from an embodiment of META, representing the basic transformation options available to a designer.

In one embodiment, the designer can start in the shared image asset library and see all hotspots available for that base object, as depicted in the first tab of the left side of FIG. 13 (the "Library" tab). Each view angle is represented by a folder. By expanding a folder, the designer can see an organized list of all hotspots for that view. From this expanded menu, the designer can drag and drop the symbol for any hotspot (even from an alternate view angle) and drop it onto the vehicle image. Once a hotspot has been dropped onto a vehicle, that hotspot may be rotated, scaled, skewed, etc. using the transformation tool bar, shown in FIG. 14.

As depicted in the second tab on the left side of FIG. 13 (the "Layers" tab), the designer also may adjust the z-order of the layered assets. For example, if an accessory image needs to be positioned behind the vehicle, the designer may select that layer and move it into a position below the model layer. If the designer needs to adjust assets within the model layer, he/she may select that layer and adjust the decal, mask, or image assets and stack them to build the vehicle. The designer also may drill into a single layer or hotspot. This embodiment allows the designer to transform an entire class of accessories within one hotspot at one time. However, if the designer does not need to transform an entire class of accessories within one hotspot but needs to create a punt, the designer can do so through the third tab on the left side of FIG. 13 (the "Products" tab). Once the designer has made all the additions and edits needed, he/she can save it, for example by clicking the save icon within the transformation toolbar, shown in FIG. 14. Saving the adjustments and punts generates the necessary SQL, executes it on the staging server, and saves it to a deployment package along with any needed image assets for deployment.

Certain embodiments of META were designed to allow designers to create data-driven configurators without having to know about the underlying XML schemas involved. The interface is intentionally designed to be superficially similar to software on the market, such as ADOBE FLASH, such that designers can pull assets from a library and place them onto a stage which displays the current visual state of the vehicle. The back-end of META can communicate with an SQL database. The method of operating META comprises opening the desired vehicle; importing images of the vehicle and parts that can be installed on the vehicle; placing the parts on the vehicle; scaling, skewing, and rotating to look realistic and saving the configurator, which may entail copying the images to the correct location on the virtual private network (VPN); and sending the placement information to the database via stored procedure calls.

The product XML can split into a default product XML and a punt product XML. In addition, the product XML may also contain an "allProducts" product XML. Each hotspot may correspond to a class of accessories in the database, but only a limited number of these classes have hotspots since not all classes have parts that are visible in the configurator.

Data may be stored in the shared asset image library. The designer can pull data from the library in order to place parts on the vehicle. The designer may see only the hotspots that can be placed. When a class in the library needs to pull a symbol from the library, it can pass in the name of the symbol, and the library class can return the instance of that particular symbol.

The image XML data for each product is stored in an instance of a symbol class. There is only a single instance of a symbol, which connects to any instance that uses the symbol, so instances are kept synchronized. To synchronize the instances, the symbol class may extend to any organized data set capable of synchronization, for example the ADOBE FLEX XMLLISTCOLLECTION. This data set can keep track of changes that are made to the XML. It can store and spawn events when a change is made to a symbol class. These events can trigger updates in any instances which use the affected symbol.

While a symbol stores its data in XML, an instance subclasses the class for displaying nested graphical data. This subclassed class can be ADOBE FLASH Sprite class, or equivalent display list node that can display graphics. Whenever the subclassed class receives an event from its associated symbol, the instance updates the associated property. For example, when a t-matrix is changed, the instance converts the t-matrix string into ADOBE FLASH MATRIX data type and updates its value with the new matrix value. An instance may be draggable or static.

For non-colorable parts, the Image is the only media necessary. The mask and decal allow the image to be colored. The mask is a grayscale bitmap limited to the colorable part of the product. The decal contains the highlight and shadow information. When the assets are layered on top of one another, a hexadecimal RGB value can be fed into the desaturated mask layer and change the color of the vehicle. Highlights and shadows remain sharp due to the decal layer, and the other elements of the vehicle (tires, glass, headlights, chrome, etc.) are unaffected as they are viewed through holes in both the mask layer and the decal layer.

To allow the designer to transform images of accessories so that they can fit on a variety of vehicles, in one embodiment META utilizes SENOCULAR Transform Tool, but any image transformational tool may be used. This tool is used to graphically adjust the t-matrices of instances, which in turn triggers the associated symbols to be updated, such that any change made via the transformational tool can notify other instances that use the same symbol. Any tool that accomplishes a similar result may be used.

Designers may add new images to the configurator and have them show up in the correct hotspot, associated with the correct product. This may be accomplished by two means. The first is through the use of a specific naming standard which, when followed, provide the information necessary to add the image file. For example, if the image name is "19172622_000_Front_Mask.png", its corresponding part number might be 19172622. By using the "allProducts" XML file, it may be determined that this product is a part of the VentVisor class and that it is installed in angle "000" in the layer VentVisor>Front. Also, it can be determined that this image is a mask image. If the image name does not specify the anchor tag, the anchor tag may have a default, for example a value of 128, which can be adjusted by the designer.

The second means of adding new images to the configurator and having them show up in the correct hotspot is for the designer to select the product he/she wants to add from the list of all possible products and subsequently drag and drop the images onto spaces for the image, mask, and decal.

Certain embodiments of the present invention resolve the problem associated with the instance-symbol combination, the problem being that all of the XML nodes must be of the same type. These embodiments contemplate that the view and layer types contain and subclass a collection of types. The view type may contain both the background image, which typically is the shadow of the vehicle or location in which the vehicle is placed, and the collection of layers to be displayed. The layer type may contain the vMask or the default image used to display factory-installed accessories, and the instance used for holding the collection of product symbols. This instance may be placed and transformed, and the vMask and/or default image can be set elsewhere.

Once the data from the types are added, the data can be loaded into META. The top level of the XML documents may contain the information about the vehicle, as depicted in FIG. 9. Each vehicle is assigned a catalog ID, which corresponds to brand, and an App ID, which corresponds to the specific vehicle. When the designer initially loads the tool, he/she selects the correct brand, and input the appropriate App ID. These IDs are inserted into a URL, and a request is made to the server. When the server returns the data, it can be processed, for example by ADOBE FLEX XML DOM.

EXAMPLE 1

The XML documents may split up at the top level. Typically the top level is the exterior of the vehicle, but it is also contemplated that the interior of the vehicle could be configured and previewed.

The next level down in the XML may contain the "view" nodes. Each view has an "angle" attribute that roughly corresponds to the angle from which the photo of the vehicle was taken. For the accessories, there is limited flexibility in terms of how much variation there can be between the angle and elevation at which the photo of the product was initially taken, and the angle and elevation of the vehicle at which the product would look convincing. However, it is often possible to flip the image and use the product on vehicle angles that are more or less a mirror image of the product image's original photograph. In META, a view consists of a photo of the vehicle taken from that angle, all of the hotspots that have been installed on that vehicle, and the parts that are available with images for each hotspot. In terms of data, each view has a collection of layers that are ordered by depth. This collection corresponds to how the layers will be stacked when the vehicle is displayed in the configurator.

At the next level down, the XML is divided by hotspot. Each hotspot is essentially an accessory class, but a single hotspot can have images in multiple layers. One method of handling single hotspots corresponding to multiple layers is by combining the hotspot name with the shape name in the menu for the Library. For example, a DoorHandles class with a Front entry and a Rear entry may be combined to make a "DoorHandles>Front" layer, and a "DoorHandles>Rear" layer. The shape may contain media image information about the default image that should show up at this particular hotspot location. The shape may also contain a path to a vector mask image.

The next level down of the XML may contain actual parts. When the database returns the product XML, it includes products that have image assets available for it. Initially, this image information may be stored in media XML nodes inside the product symbols. When a hotspot is placed on the vehicle, the associated images can be loaded and displayed.

The next level of the XML may contain the media nodes. These nodes may be of a type selected from image, mask, or decal. Each type has a path to the actual image. As the designer adds, changes, and removes images, the changes take place at the associated XML node.

When the vehicle is loaded and all the images are displayed, the designer may begin editing the vehicle. A designer's main areas of interest can be shown, for example the "Library", "Layers", and "Products" tabs depicted in FIG. 13. The Library tab contains a list of all layers available to place on the vehicle. After each layer is placed, it may be marked for the designer's notification. If the designer adds a new part in a hotspot that has not been placed yet, that hotspot can show up in the Library as a place-able layer.

When a layer has been dragged out of the Library and dropped onto the stage, it can appear in the Layers tab. Functionally, this action means that a new shape XML node has been added to the symbol corresponding to the current view. The order of these nodes may determine the stacking of the layers on the stage. By dragging a layer and dropping it at a different location in the list, the designer may change the order. More specifically, the designer can remove the node and re-insert it at the place in the list where the designer dropped it. Each layer can also have its visibility and editability toggled, for example by toggling ADOBE FLASH's built-in "visible" and "mouseEnabled" properties. When the image transformation tool is used with this tab, it can change the t-matrix for the shape that is associated with the selected layer.

The third tab is the "Products" tab. Within this tab, the designer may add, swap out, transform, and remove part images. In the image's properties, the designer can replace the images being used for that product. Replacing an image modifies the path that is stored in the corresponding media XML node. Alternatively, the user may select the "Add product" option where he/she may select the part and part class to which he/she wants to add part images.

After the configurator has been created, the designer can save it. Saving the configurator notifies META to begin the process of collecting information about the current state of the configurator in order to output that information as a series of stored procedure calls. First, the information necessary for the model XML is gathered. The model XML data may be cleared out and re-saved each time to simplify the process. It is a matter of looping through the layers of the configurator; collecting the layer, image, and t-matrix information; and converting the information into stored procedure calls.

The process for gathering the information to save the product data involves keeping track of what products have been changed while the designer is editing the configurator, and transforming those changes into stored procedure calls. The changes are kept to a minimum to avoid disrupting other vehicles that use the same product images. If the t-matrix has changed, other information about the part is preserved.

Once the list of stored procedure calls is compiled, it can be uploaded to the staging server in the form of a text file where it may be run. The list is also saved in a deployment folder, so that after the changes have been tested, they can be deployed to a live production server. The images may be copied to both the test server and the deployment folder via a VPN connection.

EXAMPLE 2

In one embodiment, META can be written in ACTIONSCRIPT 2.0, and is meant to be compatible with the latest FLASH Player, thereby increasing compatibility with older systems. The configurator tool is created using the latest Macromedia FLASH, and later, the latest ADOBE FLASH CS-series product. FLASH can be selected for its ability to nest graphics, its vector and bitmap image display capabilities, and its advanced image modification capabilities, mainly coloring and transforming images, and ability to use vector graphics to mask other vector or bitmap graphics.

EXAMPLE 3

In one embodiment, META may be written in ACTIONSCRIPT 3.0. It can be created using the FLEX BUILDER development platform, with the latest FLEX SDK. Flex can be selected given the prevalence of other ADOBE software (PHOTOSHOP, ILLUSTRATOR) in the graphics pipeline and the fact that the Configurator tool can be created using FLASH. FLEX and FLASH share the same basic class hierarchy for its graphics classes. The graphics capabilities of later FLASH versions mostly build on previous versions, making it more straightforward to create an interactive GUI in FLEX, allowing designers see how the configurator they create will appear in the earlier FLASH Players.

EXAMPLE 4

META can be used with the latest version of ADOBE AIR. ADOBE AIR can be selected for its ability to work with local files. AIR allows designers to drag image files from their desktop onto the stage where those files can be displayed and copied to the proper location on the VPN.

EXAMPLE 5

In one embodiment, local network file-servers may be used for retrieving and storing image assets for both vehicles and part images. These assets can be organized in a hierarchical folder structure designed to make locating and naming a more intuitive process. Local database servers are frequently deployed with snapshots of the production database for up-to-date access to accurate part and vehicle fitment data, while at the same time localizing changes to a safe sandbox environment. Base object and fitment data can be read into META via XML responses to representational state transfer (REST) queries, while resulting updates can be posted as SQL commands to be executed directly on the database server.

The collection of database updates in SQL and image assets stored on the file server constitute a deployment kit to be tested. Similar processes can be utilized to deploy database updates and image assets to test servers for production for the final deployment.

EXAMPLE 6

All communication can be done in the XML. Both the configurator and META tools may use REST standards for retrieving data from the server. META may use stored procedure calls listed in a basic text format when sending data to the server to be saved.

Figure 15:
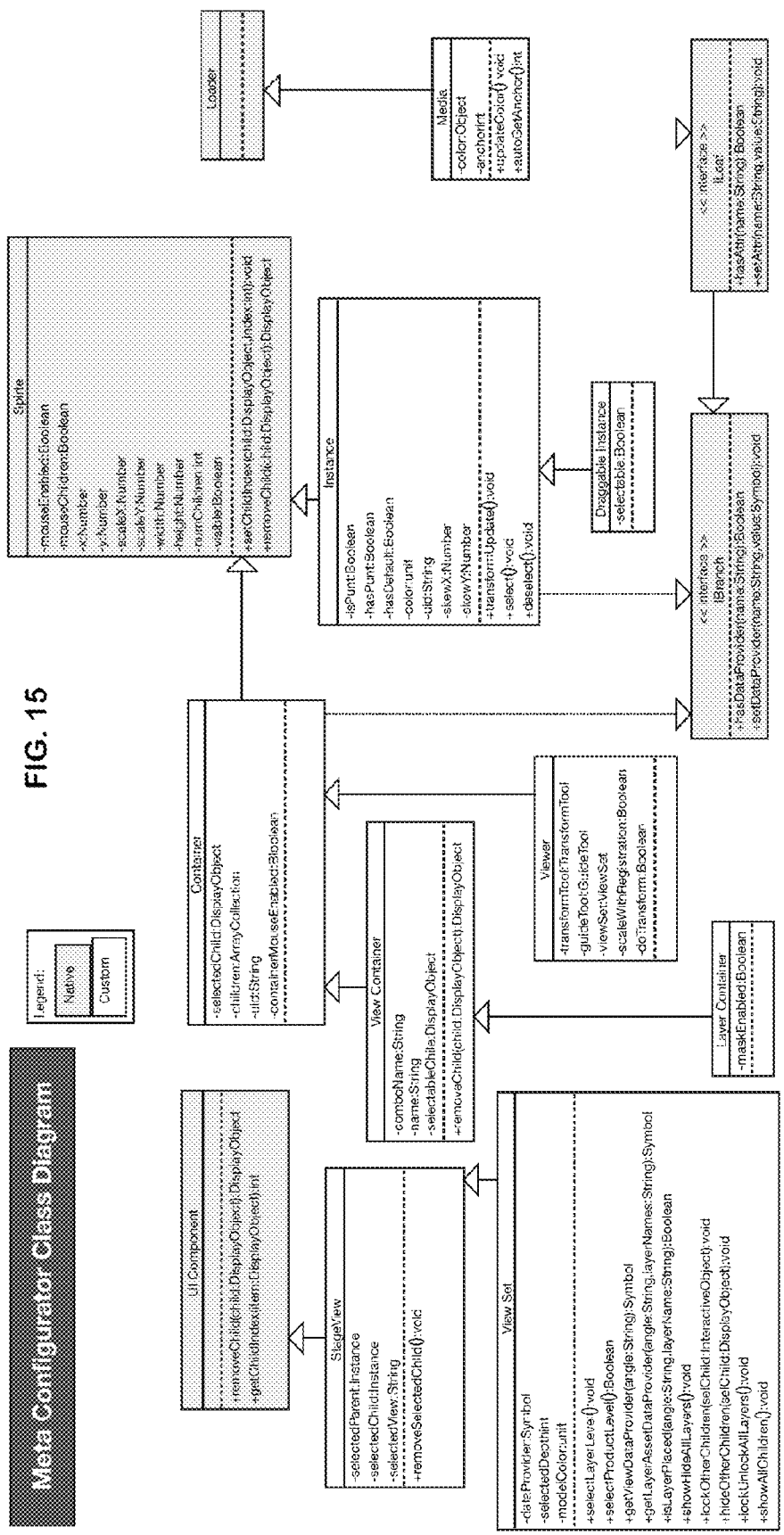
FIG. 15 is a walk-through of typical functions of an embodiment of META.

FIG. 15 depicts a walk-through of typical functions encoded in this embodiment, as understood by a person of ordinary skill in the art.

Figure 20:
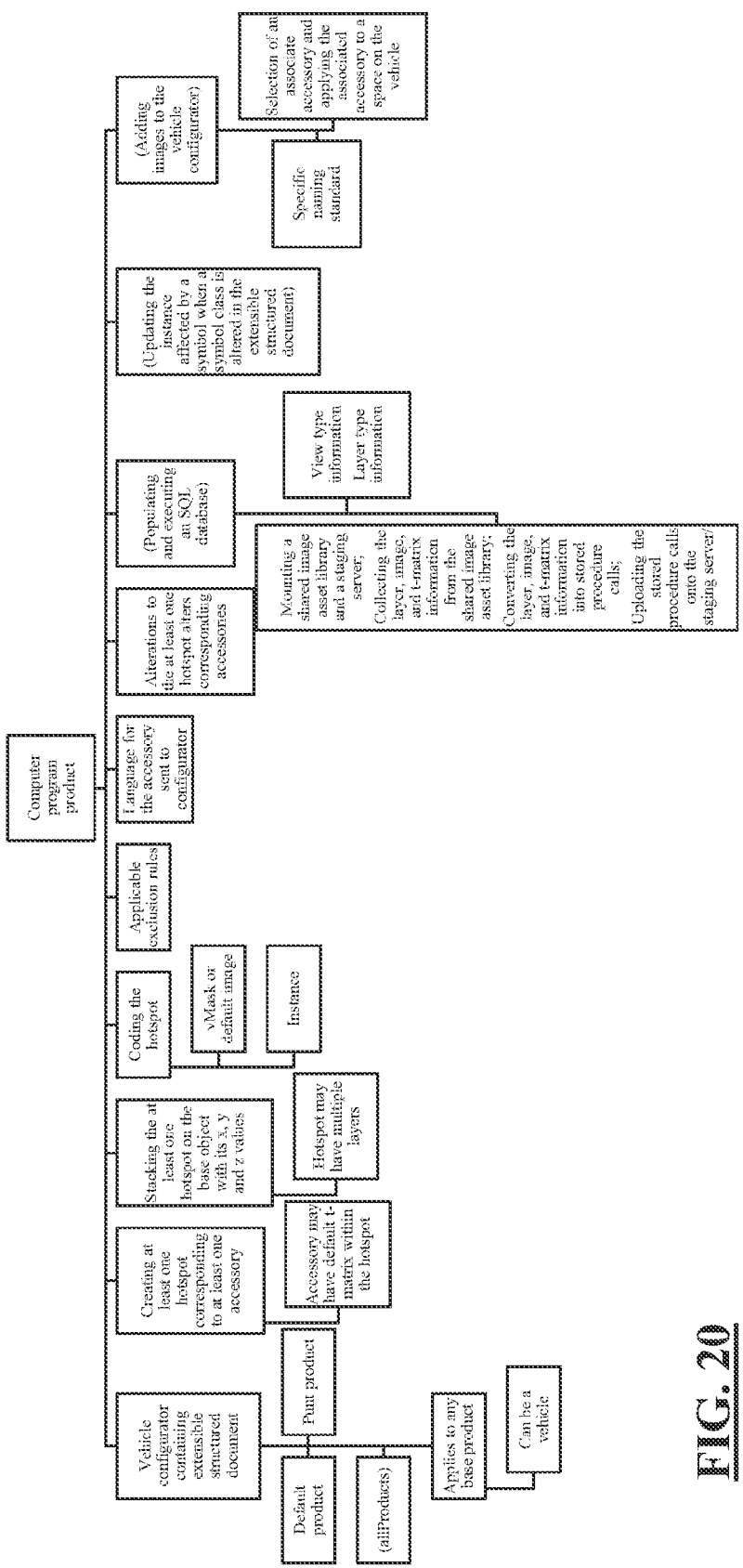
FIG. 20 is a flowchart depicting embodiments of META.

FIG. 20 depicts a flowchart of certain embodiments of META, as previously described.

Figure 21:
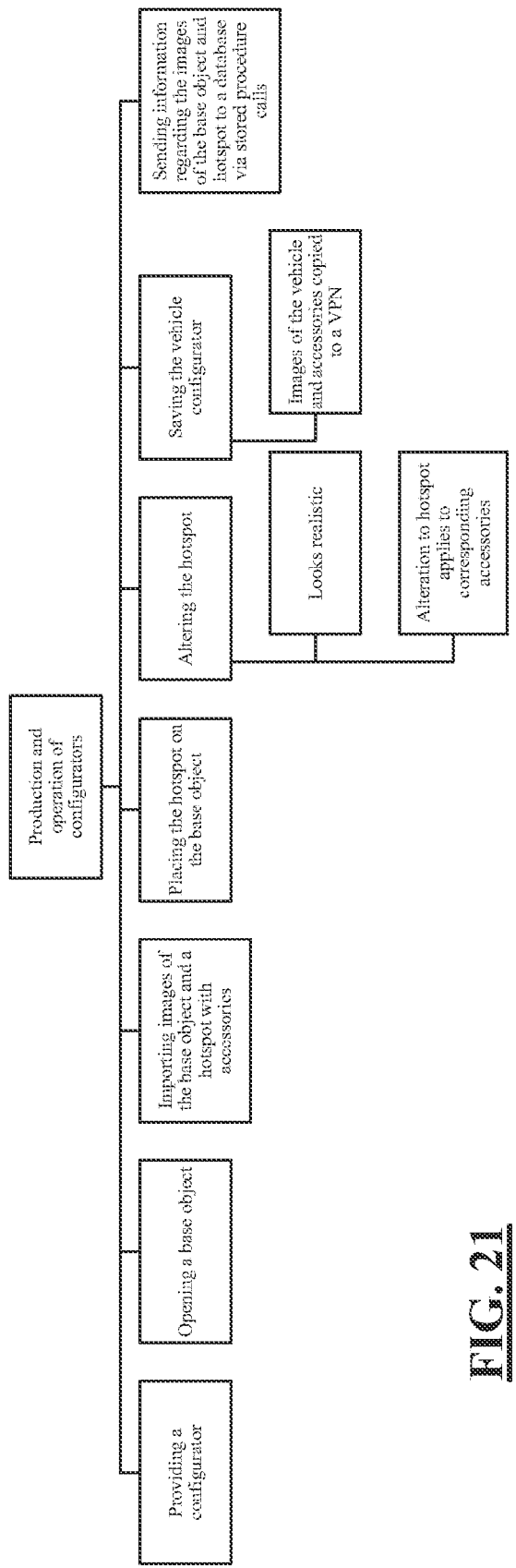
FIG. 21 is a flowchart depicting a method of producing and operating configurators for base objects.

FIG. 21 depicts a flowchart of producing and operating a configurator for any base object, as previously described.

Figure 22:
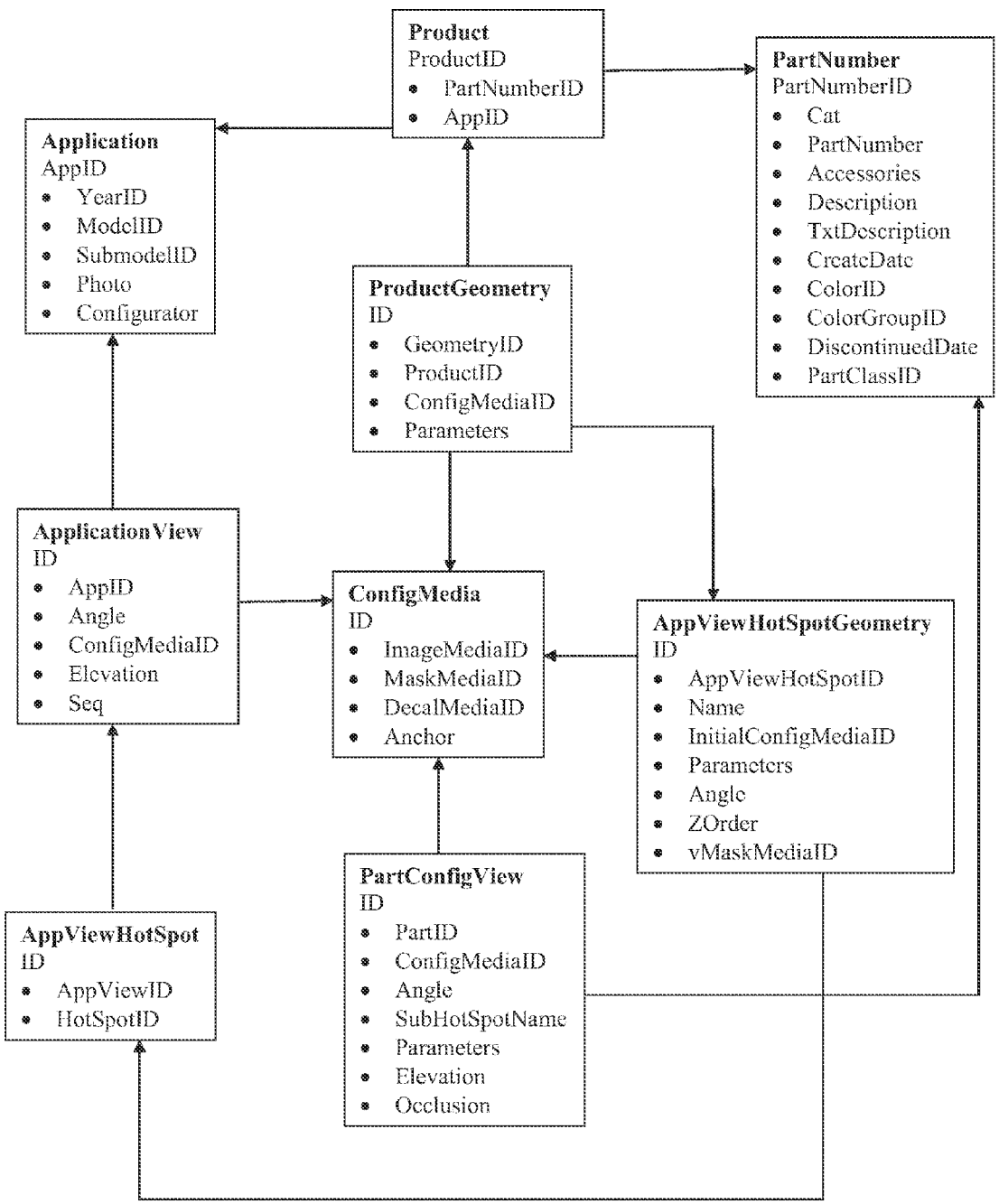
FIG. 22 is a database table diagram depicting an embodiment of the interrelationship of configurator elements in an extensible structured document.

FIG. 22 depicts a database chart diagram, as understood by a person of ordinary skill in the art, showing an example of how various elements of META may relate to each other in an extensible structured document.

5. Implementation Of Meta

Figure 19A:
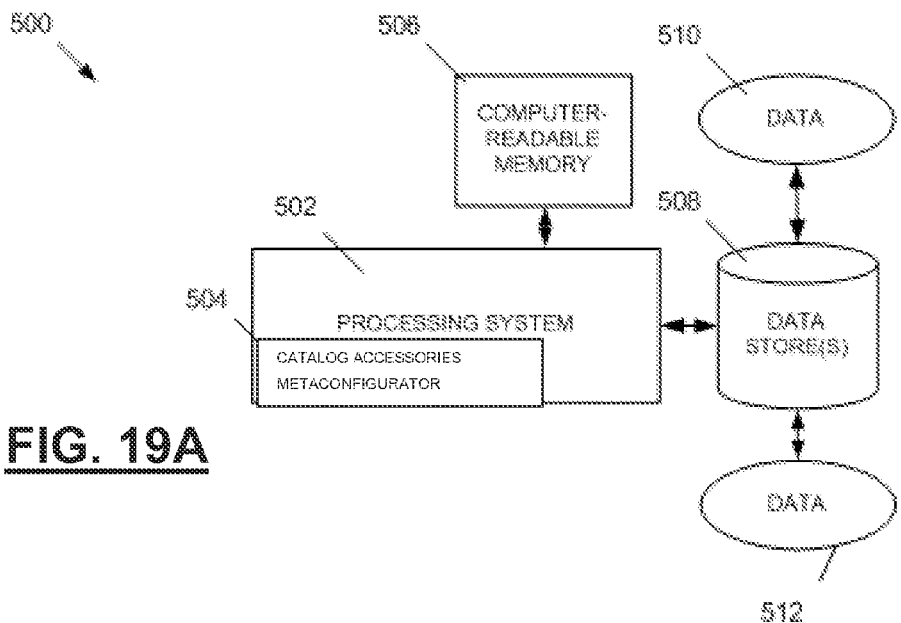
FIG. 19A is an example system for use in implementing META.
Figure 19B:
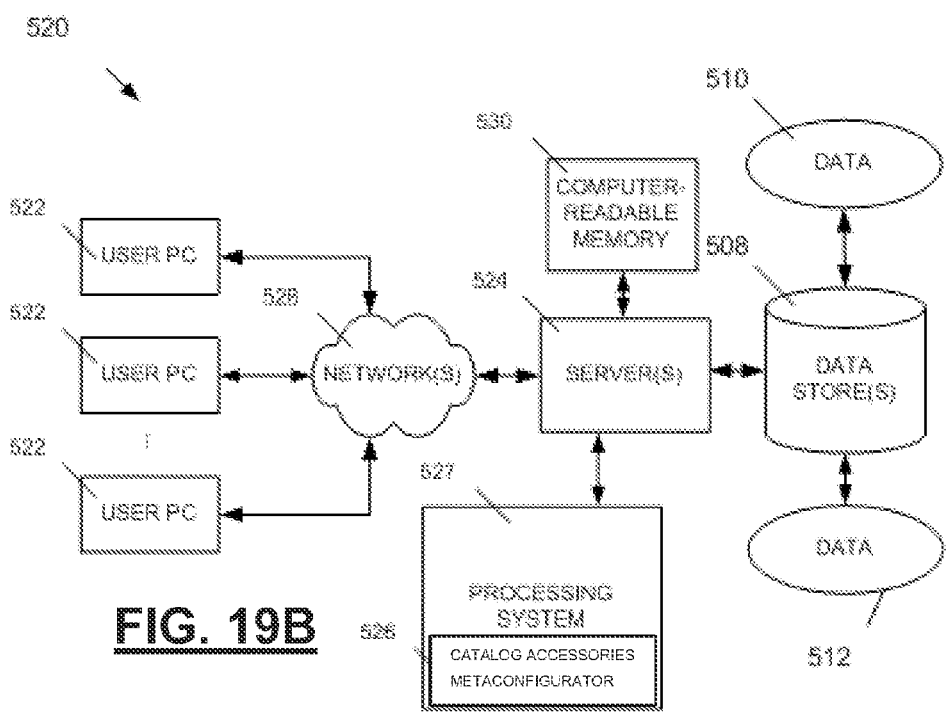
FIG. 19B is an example system for use in implementing META.
Figure 19C:
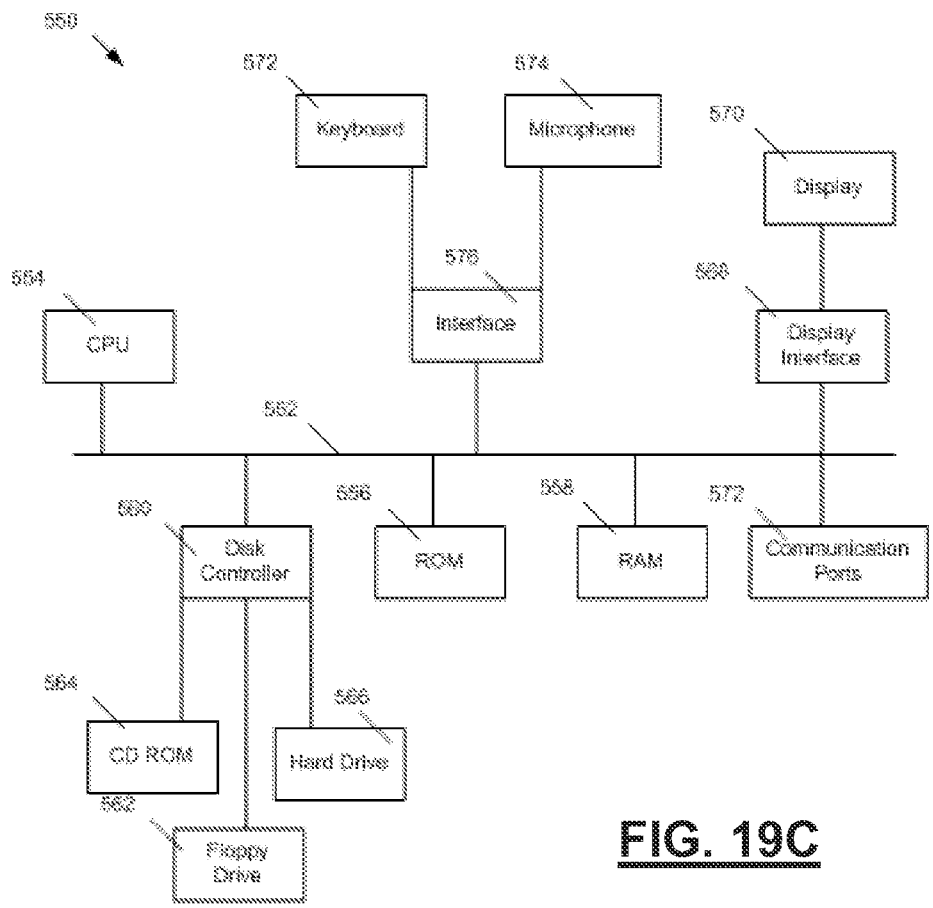
FIG. 19C is an example system for use in implementing META.

FIGS. 19A, 19B, and 19C depict example systems for use in implementing a catalog accessories metaconfigurator. For example, FIG. 19A depicts an exemplary system 500 that includes a standalone computer architecture where a processing system 502 (e.g., one or more computer processors) includes a catalog accessories metaconfigurator 504 being executed on it. The processing system 502 has access to a computer-readable memory 506 in addition to one or more data stores 508. The one or more data stores 508 may include a variety of data 510, 512.

FIG. 19B depicts a system 520 that includes a client server architecture. One or more user PCs 522 accesses one or more servers 524 running a catalog accessories metaconfigurator 526 on a processing system 527 via one or more networks 528. The one or more servers 524 may access a computer readable memory 530 as well as one or more data stores 532. The one or more data stores 532 a variety of data 534, 536.

FIG. 19C shows a block diagram of exemplary hardware for a standalone computer architecture 550, such as the architecture depicted in FIG. 19A that may be used to contain and/or implement the program instructions of system embodiments of the present invention. A bus 552 may serve as the information highway interconnecting the other illustrated components of the hardware. A processing system 554 labeled CPU (central processing unit) (e.g., one or more computer processors), may perform calculations and logic operations required to execute a program. A processor-readable storage medium, such as read only memory (ROM) 556 and random access memory (RAM) 558, may be in communication with the processing system 554 and may contain one or more programming instructions implementing a catalog accessories metaconfigurator. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 560 interfaces one or more optional disk drives to the system bus 552. These disk drives may be external or internal floppy disk drives such as 562, external or internal CD-ROM, CD-R, CD-RW or DVD drives such as 564, or external or internal hard drives 566. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 560, the ROM 556 and/or the RAM 558. Preferably, the processor 554 may access each component as required.

A display interface 568 may permit information from the bus 556 to be displayed on a display 570 in audio, graphic, or alphanumeric format. Communication with external devices may optionally occur using various communication ports 572.

In addition to the standard computer-type components, the hardware may also include data input devices, such as a keyboard 572, or other input device 574, such as a microphone, remote control, pointer, mouse and/or joystick.

As additional examples, for example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, FLASH memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It will be seen that the advantages set forth above and those made apparent from the foregoing description are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A computer program product for standardizing the appearance of related product accessories installed on a base product presented in a plurality of view-angles including software executable instructions stored in a non-transitory, computer readable medium for performing a method by running a software program on a computer, the method including issuing instructions from the computer software program comprising:
    loading into a configurator application visualization data for the base product, providing a designer graphics user interface displaying the base product and an accessory image, the accessory image representative of a product accessory compatible with the base product;
    providing an image transformation tool manually operable by a designer to fit the accessory image to the base product, operations to fit the accessory selected from the group consisting of scaling, skewing, translation and rotation, the operations resulting in a transformation;
    saving the transformation as a t-matrix profile for each view-angle of the base product;
    establishing an accessory classification for additional accessories that fit the base product in a substantially similar fashion;
    associating the t-matrix profiles to the accessory classification;
    updating the visualization data with the t-matrix profiles assignment and accessory image information; and
    providing a customer graphic user interface for interchangeably viewing a plurality of accessories fitted to the base product wherein the transformations saved as t-matrix profiles automatically transform the additional accessory images belonging to the same accessory classification previously assigned to the accessory image fitted to the base product by the designer.

2. The computer program product of claim 1, wherein the base product is a vehicle.

3. The computer program product of claim 1, further comprising instructions for adding images to the configurator through use of a specific computer file naming standard.

4. The computer program product of claim 1, wherein the format of the extensible structured document is XML.

5. A computer program product for standardizing the appearance of related product accessories installed on a base product presented in a plurality of view-angles including software executable instructions stored in a non-transitory, computer readable medium for performing a method by running a software program on a computer, the method including issuing instructions from the computer software program comprising:
    loading into a configurator application visualization data for the base product, providing a designer graphics user interface displaying the base product at the plurality of view angles and an accessory hotspot, the accessory hotspot a generic placeholder for a product accessory visually compatible with the base product when viewed at a selected angle within the plurality of view angles;
    providing an image transformation tool manually operable by a designer to fit the accessory hotspot to the base product, operations to fit the accessory hotspot selected from the group consisting of scaling, skewing, translation and rotation, the operations resulting in a transformation;
    saving the transformation as a t-matrix profile for each view-angle of the base product;
    establishing an accessory classification for product accessories that fit the base product at the accessory hotspot;
    associating the t-matrix profiles to the accessory classification;
    updating the visualization data with the t-matrix profiles; and
    providing a customer graphic user interface for interchangeably viewing a plurality of accessories fitted to the base product wherein the transformations saved as t-matrix profiles automatically transform the additional accessory images belonging to the same accessory classification previously assigned to the accessory hotspots fitted to the base product by the designer.

6. The computer program product of claim 5, wherein the base product is a vehicle.

7. The computer program product of claim 5, further comprising instructions for adding images to the configurator through use of a specific computer file naming standard.

8. The computer program product of claim 5, wherein the format of the extensible structured document containing the visualization data is XML.

9. The computer program product of claim 8, wherein the visualization data is loaded into the configurator application as an XML payload.

10. The computer program product of claim 8, wherein the visualization data is loaded into the configurator application as an XML stream returned by a URL.

11. The computer program product of claim 5, wherein an image for the base product is grayscale and the visualization data includes an RGB color value to render the base product in a dynamically-defined color.

12. The computer program product of claim 5, wherein the visualization data includes a z-axis attribute defining how a plurality of hotspots stack relative to each other whereby the designer may occlude the accessory images respective to the base product.

13. A computer program product for standardizing the appearance of related product accessories installed on a base product presented in a plurality of view-angles including software executable instructions stored in a non-transitory, computer readable medium for performing a method by running a software program on a computer, the method including issuing instructions from the computer software program comprising:

loading into a configurator application visualization data for the base product, providing a designer graphics user interface displaying the base product at the plurality of view angles and an accessory hotspot, the accessory hotspot a generic placeholder for a product accessory visually compatible with the base product when viewed at a selected angle within the plurality of view angles;

providing an image transformation tool manually operable by a designer to fit the accessory image to the base product, operations to fit the accessory selected from the group consisting of scaling, skewing, translation and rotation thereby resulting in a transformation;

saving the transformation as a t-matrix profile for each view-angle of the base product;

establishing an accessory classification for additional accessories that fit the base product in a substantially similar fashion;

associating the t-matrix profiles to the accessory classification;

updating the visualization data in the extensible structured document with the t-matrix profiles assignment and accessory image information;

generating a stored procedure from the extensible structured document, the stored procedure containing SQL commands to update a relational database with the visualization data;

executing the stored procedure against the relational database; and providing a customer graphic user interface for interchangeably viewing a plurality of accessories fitted to the base product wherein the transformations saved as t-matrix profiles automatically transform the additional accessory images belonging to the same accessory classification previously assigned to the accessory image fitted to the base product by the designer.

14. The computer program product of claim 13, wherein the base product is a vehicle.

15. The computer program product of claim 13, further comprising instructions for adding images to the configurator through use of a specific computer file naming standard.

16. The computer program product of claim 13, wherein the format of the extensible structured document containing the visualization data is XML.

17. The computer program product of claim 13, wherein the visualization data is loaded into the configurator application as an XML payload.

18. The computer program product of claim 13, wherein the visualization data is loaded into the configurator application as an XML stream returned by a URL.

19. The computer program product of claim 13, wherein an image for the base product is grayscale and the visualization data includes an RGB color value to render the base product in a dynamically-defined color.

20. The computer program product of claim 13, wherein the visualization data includes a z-axis attribute defining how a plurality of hotspots stack relative to each other whereby the designer may occlude the accessory images respective to the base product.

* * * * *